US010437347B2

(12) United States Patent
Holz et al.

(10) Patent No.: US 10,437,347 B2
(45) Date of Patent: *Oct. 8, 2019

(54) INTEGRATED GESTURAL INTERACTION AND MULTI-USER COLLABORATION IN IMMERSIVE VIRTUAL REALITY ENVIRONMENTS

(71) Applicant: Leap Motion, Inc., San Francisco, CA (US)

(72) Inventors: David S. Holz, San Francisco, CA (US); Matias Perez, San Francisco, CA (US); Davide Onofrio, Mountain View, CA (US)

(73) Assignee: Ultrahaptics IP Two Limited, Bristol (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/016,463

(22) Filed: Jun. 22, 2018

(65) Prior Publication Data

US 2019/0056791 A1    Feb. 21, 2019

Related U.S. Application Data

(63) Continuation of application No. 14/751,056, filed on Jun. 25, 2015, now Pat. No. 10,007,350.
(Continued)

(51) Int. Cl.
*G09G 5/00* (2006.01)
*G06F 3/01* (2006.01)
(Continued)

(52) U.S. Cl.
CPC ......... *G06F 3/017* (2013.01); *G02B 27/0093* (2013.01); *G02B 27/017* (2013.01);
(Continued)

(58) Field of Classification Search
CPC ............. G06F 3/017; G02B 27/0172; G06K 9/00335; G06K 9/00671; H04N 5/332;
(Continued)

(56) References Cited

U.S. PATENT DOCUMENTS 4,521,831 A    6/1985 Thayer
4,734,939 A    4/1988 Copp
(Continued)

FOREIGN PATENT DOCUMENTS

KR    20130079841 A    7/2013
WO    20090142797 A2    11/2009
WO    2015172118 A1    11/2015

OTHER PUBLICATIONS

U.S. Appl. No. 14/620,093, filed Feb. 11, 2015, Issued.
(Continued)

*Primary Examiner* — Jennifer T Nguyen
(74) *Attorney, Agent, or Firm* — Haynes Beffel & Wolfeld LLP; Ernest J. Beffel, Jr.

(57) ABSTRACT

The technology disclosed relates to tracking motion of a wearable sensor system using a combination a RGB (red, green, and blue) and IR (infrared) pixels of one or more cameras. In particular, it relates to capturing gross features and feature values of a real world space using RGB pixels and capturing fine features and feature values of the real world space using IR pixels. It also relates to enabling multi-user collaboration and interaction in an immersive virtual environment. It also relates to capturing different sceneries of a shared real world space from the perspective of multiple users. It further relates to sharing content between wearable sensor systems. In further relates to capturing images and video streams from the perspective of a first user of a wearable sensor system and sending an
(Continued)

augmented version of the captured images and video stream to a second user of the wearable sensor system.

15 Claims, 18 Drawing Sheets

Related U.S. Application Data

(60) Provisional application No. 62/017,805, filed on Jun. 26, 2014.

(51) Int. Cl.
- *G02B 27/01* (2006.01)
- *G06K 9/00* (2006.01)
- *G02B 27/00* (2006.01)
- *G06T 7/246* (2017.01)
- *H04N 5/33* (2006.01)

(52) U.S. Cl.
CPC ..... *G02B 27/0172* (2013.01); *G06K 9/00335* (2013.01); *G06K 9/00671* (2013.01); *G06T 7/246* (2017.01); *G02B 2027/014* (2013.01); *G02B 2027/0138* (2013.01); *G02B 2027/0181* (2013.01); *G02B 2027/0187* (2013.01); *G06T 2207/10016* (2013.01); *G06T 2207/10024* (2013.01); *G06T 2207/10048* (2013.01); *G06T 2207/30244* (2013.01); *H04N 5/332* (2013.01)

(58) Field of Classification Search
CPC ............. H04N 13/0239; H04N 5/2256; H04N 13/0296; H04N 13/0257
USPC ...................................... 345/8, 156, 157, 419
See application file for complete search history.

(56) References Cited

U.S. PATENT DOCUMENTS

| | | | |
|---|---|---|---|
| 5,900,849 | A | 5/1999 | Gallery |
| 7,050,606 | B2 | 5/2006 | Paul et al. |
| D552,152 | S | 10/2007 | Almond |
| 7,289,645 | B2 | 10/2007 | Yamamoto et al. |
| D620,514 | S | 7/2010 | Kim et al. |
| D627,815 | S | 11/2010 | Oba |
| D656,175 | S | 3/2012 | Fong |
| 8,375,473 | B2 | 2/2013 | Celona et al. |
| 8,396,252 | B2 | 3/2013 | El Dokor |
| D689,539 | S | 9/2013 | Zaletel et al. |
| 8,661,571 | B1 | 3/2014 | Teetzel et al. |
| 8,744,645 | B1 | 6/2014 | Vaghefinazari et al. |
| 8,781,171 | B2 | 7/2014 | King et al. |
| D717,361 | S | 11/2014 | Nikaido |
| 8,942,881 | B2 | 1/2015 | Hobbs et al. |
| D756,443 | S | 5/2016 | Ju et al. |
| 9,685,003 | B2 | 6/2017 | Lazarow et al. |
| 9,741,169 | B1 | 8/2017 | Holz |
| 10,007,350 | B1* | 6/2018 | Holz ...................... G06F 3/017 |
| 2002/0107637 | A1 | 8/2002 | Okamura et al. |
| 2003/0076996 | A1 | 4/2003 | Neumann et al. |
| 2005/0063564 | A1 | 3/2005 | Yamamoto et al. |
| 2005/0264527 | A1 | 12/2005 | Lin |
| 2006/0273984 | A1 | 12/2006 | Wanda et al. |
| 2009/0038056 | A1 | 2/2009 | Bobbin et al. |
| 2009/0278915 | A1 | 11/2009 | Kramer et al. |
| 2009/0315837 | A1 | 12/2009 | Geiger |
| 2009/0323121 | A1 | 12/2009 | Valkenburg et al. |
| 2010/0175172 | A1 | 7/2010 | Dempsey et al. |
| 2011/0090252 | A1 | 4/2011 | Yoon et al. |
| 2011/0145981 | A1 | 6/2011 | Teetzel et al. |
| 2011/0239354 | A1 | 10/2011 | Celona et al. |
| 2012/0132682 | A1 | 5/2012 | Mongan et al. |
| 2012/0143361 | A1 | 6/2012 | Kurabayashi et al. |
| 2012/0170800 | A1 | 7/2012 | da Silva Frazao et al. |
| 2012/0194420 | A1 | 8/2012 | Osterhout et al. |
| 2012/0320013 | A1* | 12/2012 | Perez ....................... H04N 5/91 345/207 |
| 2013/0002649 | A1 | 1/2013 | Wu et al. |
| 2013/0044128 | A1* | 2/2013 | Liu .......................... G09G 5/00 345/633 |
| 2013/0095924 | A1 | 4/2013 | Geisner et al. |
| 2013/0156296 | A1 | 6/2013 | El Dokor |
| 2013/0182077 | A1 | 7/2013 | Holz |
| 2013/0204457 | A1 | 8/2013 | King et al. |
| 2013/0261871 | A1 | 10/2013 | Hobbs et al. |
| 2013/0271370 | A1 | 10/2013 | Wang et al. |
| 2013/0278631 | A1 | 10/2013 | Border et al. |
| 2013/0293723 | A1 | 11/2013 | Benson et al. |
| 2013/0300637 | A1 | 11/2013 | Smits et al. |
| 2013/0307856 | A1 | 11/2013 | Keane et al. |
| 2013/0321390 | A1* | 12/2013 | Latta ....................... G06T 11/00 345/419 |
| 2013/0335301 | A1 | 12/2013 | Wong et al. |
| 2013/0335573 | A1 | 12/2013 | Forutanpour et al. |
| 2014/0030687 | A1 | 1/2014 | Etchegoyen |
| 2014/0099019 | A1 | 4/2014 | El Dokor |
| 2014/0152809 | A1 | 6/2014 | Jarvis |
| 2014/0189938 | A1 | 7/2014 | Redpath et al. |
| 2014/0225918 | A1 | 8/2014 | Mittal et al. |
| 2014/0306874 | A1 | 10/2014 | Finocchio et al. |
| 2014/0306891 | A1 | 10/2014 | Latta et al. |
| 2014/0306993 | A1 | 10/2014 | Poulos et al. |
| 2014/0361976 | A1 | 12/2014 | Osman et al. |
| 2015/0016777 | A1 | 1/2015 | Abovitz et al. |
| 2015/0040297 | A1 | 2/2015 | Vermillion |
| 2015/0054729 | A1 | 2/2015 | Minnen et al. |
| 2015/0122855 | A1 | 5/2015 | Parsons et al. |
| 2015/0177842 | A1 | 6/2015 | Rudenko |
| 2015/0317831 | A1 | 11/2015 | Ebstyne et al. |
| 2015/0320189 | A1 | 11/2015 | Ju et al. |
| 2015/0326762 | A1 | 11/2015 | Ju et al. |
| 2015/0351482 | A1 | 12/2015 | Gendron et al. |
| 2015/0366284 | A1 | 12/2015 | Dowling et al. |
| 2016/0044298 | A1 | 2/2016 | Holz et al. |

OTHER PUBLICATIONS

U.S. Appl. No. 14/620,182, filed Feb. 11, 2015, Abandoned.
U.S. Appl. No. 14/620,183, filed Feb. 11, 2015, Abandoned.
U.S. Appl. No. 16/016,292, filed Jun. 22, 2018, US-2019-0064918-A1, Feb. 28, 2019, Pending.
U.S. Appl. No. 14/690,296, filed Apr. 17, 2015, Issued.
U.S. Appl. No. 15/693,365, filed Aug. 31, 2017, US-2018-0012074-A1, Jan. 11, 2018, Pending.
U.S. Appl. No. 14/708,021, filed May 8, 2015, US-2015-0320189-A1, Nov. 12, 2015, Abandoned.
U.S. Appl. No. 14/708,184, filed May 8, 2015, US-2015-0326762-A1, Nov. 12, 2015, Abandoned.
U.S. Appl. No. 14/821,499, filed Aug. 7, 2015, US-2016-0044298-A1, Feb. 11, 2016, Allowed.
U.S. Appl. No. 14/718,002, filed May 20, 2015, Issued.
U.S. Appl. No. 15/681,251, filed Aug. 18, 2017, US-2017-0345219-A1, Nov. 30, 2017, Pending.
U.S. Appl. No. 14/751,056, filed Jun. 25, 2015, Issued.
U.S. Appl. No. 14/821,499—Office Action dated Feb. 23, 2018, 33 pages.
U.S. Appl. No. 14/821,499—Response to Office Action dated Feb. 23, 2018 filed Jul. 27, 2018, 18 pages.
U.S. Appl. No. 14/821,499—Supplemental Response to Office Action dated Feb. 23, 2018 filed Nov. 1, 2018, 17 pages.
U.S. Appl. No. 14/821,499—Notice of Allowance dated Feb. 12, 2019, 13 pages.
U.S. Appl. No. 14/821,499—Amendment after Notice of Allowance dated Feb. 12, 2019, 9 pages.
U.S. Appl. No. 14/718,002—Office Action dated Dec. 29, 2016, 10 pages.
U.S. Appl. No. 14/997,454—Office Action dated Dec. 1, 2016, 13 pages.

(56) References Cited

OTHER PUBLICATIONS

U.S. Appl. No. 14/718,002—Response to Office Action dated Dec. 29, 2016 filed Mar. 29, 2017, 10 pages.
U.S. Appl. No. 14/718,002—Notice of Allowance dated Apr. 18, 2017, 17 pages.
U.S. Appl. No. 15/681,251—Office Action dated Jan. 14, 2019, 14 pages.
U.S. Appl. No. 15/681,251—Response to Office Action dated Jan. 14, 2019 filed May 14, 2019, 19 pages.
U.S. Appl. No. 14/751,056—Office Action dated Aug. 18, 2017, 15 pages.
U.S. Appl. No. 14/751,056—Response to Office Action dated Aug. 18, 2017, filed on Dec. 11, 2017, 12 pages.
U.S. Appl. No. 14/751,056—Notice of Allowance dated Feb. 26, 2018, 5 pages.
U.S. Appl. No. 14/620,182—Office Action dated Mar. 11, 2016, 66 pages.
PCT/US2015/030040—International Search Report dated Aug. 13, 2015, 3 pages.
PCT/US2015/030040—Written Opinion of the International Searching Authority dated Aug. 13, 2015, 7 pages.
U.S. Appl. No. 14/620,182—Final Office Action dated Aug. 17, 2016, 69 pages.
U.S. Appl. No. 14/620,093—Office Action dated Aug. 26, 2016, 11 pages.
U.S. Appl. No. 14/708,184—Office Action dated Aug. 2, 2016, 14 pages.
U.S. Appl. No. 14/620,182—Response to Mar. 11 Office Action filed Jun. 13, 2016, 17 pages.
U.S. Appl. No. 14/620,182—Response to Aug. 17 Office Action filed Nov. 16, 2016, 23 pages.
U.S. Appl. No. 14/620,093—Response to Aug. 26 Office Action filed Dec. 16, 2016, 12 pages.
U.S. Appl. No. 14/708,021—Office Action dated Aug. 2, 2016, 9 pages.
U.S. Appl. No. 14/690,296—Office Action dated Oct. 13, 2016, 16 pages.
U.S. Appl. No. 14/821,499—Response to Office Action dated Oct. 4, 2017, filed Nov. 8, 2017, 7 pages.
PCT/US2015/030040—International Preliminary Report on Patentability dated Nov. 16, 2016, 8 pages1053-4WO).
CN 2014204535364—Notice of Allowance dated Apr. 17, 2015, 3 pages.
U.S. Appl. No. 14/620,182—Office Action dated Jan. 18, 2017, 101 pages.
U.S. Appl. No. 14/620,183—Office Action dated Feb. 6, 2017, 71 pages.
U.S. Appl. No. 14/620,093—Office Action dated Aug. 3, 2017, 22 pages.
U.S. Appl. No. 14/620,182—Final Office Action dated Aug. 10, 2017, 82 pages.
U.S. Appl. No. 14/620,182—Response to Office Action dated Jan. 18, 2017 filed May 18, 2017, 15 pages.
U.S. Appl. No. 14/620,183—Response to Office Action dated Feb. 6, 2017 filed May 30, 2017, 10 pages.
U.S. Appl. No. 14/620,183—Final Office Action dated Sep. 8, 2017, 26 pages.
U.S. Appl. No. 14/620,093—Response to Office Action dated Aug. 3, 2017 filed Nov. 3, 2017, 8 pages.
U.S. Appl. No. 14/620,093—Final Office Action dated Nov. 29, 2017, 12 pages.
U.S. Appl. No. 14/620,182—Response to Office Action dated Aug. 10, 2017 filed Nov. 21, 2017, 21 pages.
U.S. Appl. No. 14/620,183—Response to Office Action dated Sep. 8, 2017, filed Nov. 21, 2017, 14 pages.
U.S. Appl. No. 14/620,093—Response to Office Action dated Nov. 29, 2017, filed Jan. 12, 2018, 9 pages.
U.S. Appl. No. 14/620,093—Notice of Allowance dated Feb. 28, 2018, 9 pages.
U.S. Appl. No. 16/016,292—Office Action dated Jan. 11, 2019, 13 pages.
U.S. Appl. No. 16/016,292—Preliminary Amendment dated Nov. 13, 2018, 13 pages.
U.S. Appl. No. 16/016,292—Response to Office Action dated Jan. 11, 2019 filed May 10, 2019, 7 pages.
U.S. Appl. No. 14/620,182—Office Action dated Aug. 17, 2016, 69 pages.
U.S. Appl. No. 14/690,296—Final Office Action dated Feb. 13, 2017, 30 pages.
U.S. Appl. No. 14/690,296—Response to Office Action dated Oct. 13, 2016 filed on Jan. 13, 2017, 12 pages.
U.S. Appl. No. 15/693,365—Office Action dated Oct. 18, 2017, 24 pgs.
U.S. Appl. No. 14/690,296—Notice of Allowance dated Jul. 28, 2017, 6 pages.
U.S. Appl. No. 15/693,365—Response to Office Action dated Oct. 18, 2017, filed Mar. 7, 2018, 14 pgs.
U.S. Appl. No. 15/693,365—Noticed of Allowance dated Apr. 10, 2018, 15 pgs.
U.S. Appl. No. 16/055,012—Office Action dated Jan. 10, 2019, 9 pages.
U.S. Appl. No. 14/690,296—Response to Final Office Action dated Feb. 13, 2017 filed Apr. 13, 2017, 12 pages.
U.S. Appl. No. 16/055,012—Preliminary Amendment dated Nov. 20, 2018, 11 pages.
U.S. Appl. No. 16/055,012—Response to Office Action dated Jan. 10, 2019 filed May 10, 2019, 29 pages.
U.S. Appl. No. 14/708,184—Final Office Action dated Apr. 12, 2017, 19 pages.
U.S. Appl. No. 14/708,184—Response to Office Action dated Aug. 2, 2016 filed Dec. 23, 2016, 22 pages.
U.S. Appl. No. 14/821,499—Office Action dated Apr. 7, 2017, 27 pages.
U.S. Appl. No. 14/821,499—Response to Office Action dated Apr. 7, 2017 filed Aug. 3, 2017, 8 pages.
U.S. Appl. No. 14/821,499—Office Action dated Oct. 4, 2017, 29 pages.

* cited by examiner

INTEGRATED GESTURAL INTERACTION AND MULTI-USER COLLABORATION IN IMMERSIVE VIRTUAL REALITY ENVIRONMENTS

This application is a continuation of U.S. patent application Ser. No. 14/751,056, entitled, "INTEGRATED GESTURAL INTERACTION AND MULTI-USER COLLABORATION IN IMMERSIVE VIRTUAL REALITY ENVIRONMENTS," filed on 25 Jun. 2015, which claims the benefit of US Provisional Patent Application No. 62/017, 805, entitled, "INTEGRATED GESTURAL INTERACTION AND MULTI-USER COLLABORATION IN IMMERSIVE VIRTUAL REALITY ENVIRONMENTS," filed on 26 Jun. 2014. The provisional and non-provisional applications are hereby incorporated by reference for all purposes.

FIELD OF THE TECHNOLOGY DISCLOSED

The present disclosure relates generally to human machine interface and in particular to augmented reality for wearable devices and methods of object detection and tracking.

INCORPORATIONS

Materials incorporated by reference in this filing include the following:

"DETERMINING POSITIONAL INFORMATION FOR AN OBJECT IN SPACE", U.S. Non. Prov. application Ser. No. 14/214,605, filed 14 Mar. 2014, "RESOURCE-RESPONSIVE MOTION CAPTURE", U.S. Non-Prov. application Ser. No. 14/214,569, filed on 14 Mar. 2014, "PREDICTIVE INFORMATION FOR FREE-SPACE GESTURE CONTROL AND COMMUNICATION", U.S. Prov. App. No. 61/873,758, filed on 4 Sep. 2013, "VELOCITY FIELD INTERACTION FOR FREE SPACE GESTURE INTERFACE AND CONTROL", U.S. Prov. App. No. 61/891,880, filed on 16 Oct. 2013, "INTERACTIVE TRAINING RECOGNITION OF FREE SPACE GESTURES FOR INTERFACE AND CONTROL", U.S. Prov. App. No. 61/872,538, filed on 30 Aug. 2013, "DRIFT CANCELATION FOR PORTABLE OBJECT DETECTION AND TRACKING", U.S. Prov. App. No. 61/938,635, filed on 11 Feb. 2014, "IMPROVED SAFETY FOR WEARABLE VIRTUAL REALITY DEVICES VIA OBJECT DETECTION AND TRACKING", U.S. Prov. App. No. 61/981,162, filed on 17 Apr. 2014, "WEARABLE AUGMENTED REALITY DEVICES WITH OBJECT DETECTION AND TRACKING", U.S. Prov. App. No. 62/001,044, filed on 20 May 2014, "METHODS AND SYSTEMS FOR IDENTIFYING POSITION AND SHAPE OF OBJECTS IN THREE-DIMENSIONAL SPACE", U.S. Prov. App. No. 61/587,554, filed 17 Jan. 2012, "SYSTEMS AND METHODS FOR CAPTURING MOTION IN THREE-DIMENSIONAL SPACE", U.S. Prov. App. No. 61/724,091, filed 8 Nov. 2012, "NON-TACTILE INTERFACE SYSTEMS AND METHODS", U.S. Prov. App. No. 61/816,487, filed 26 Apr. 2013, "DYNAMIC USER INTERACTIONS FOR DISPLAY CONTROL", U.S. Prov. App. No. 61/752,725, filed on 15 Jan. 2013, "VEHICLE MOTION SENSORY CONTROL", U.S. Prov. App. No. 62/005,981, filed 30 May 2014, "SYSTEMS AND METHODS OF PROVIDING HAPTIC-LIKE FEEDBACK IN THREE-DIMENSIONAL (3D) SENSORY SPACE", U.S. Prov. App. No. 61/937,410, filed 7 Feb. 2014, "SYSTEMS AND METHODS OF INTERACTING WITH A VIRTUAL GRID IN A THREE-DIMENSIONAL (3D) SENSORY SPACE", U.S. Prov. App. No. 61/007,885, filed 4 Jun. 2014, "SYSTEMS AND METHODS OF GESTURAL INTERACTION IN A PERVASIVE COMPUTING ENVIRONMENT", U.S. Prov. App. No. 62/003,298, filed 27 May 2014, "MOTION CAPTURE USING CROSS-SECTIONS OF AN OBJECT", U.S. application Ser. No. 13/414,485, filed on 7 Mar. 2012, and "SYSTEM AND METHODS FOR CAPTURING MOTION IN THREE-DIMENSIONAL SPACE", U.S. application Ser. No. 13/742,953, filed 16 Jan. 2013.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Conventional motion capture approaches rely on markers or sensors worn by the subject while executing activities and/or on the strategic placement of numerous bulky and/or complex equipment in specialized and rigid environments to capture subject movements. Unfortunately, such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Such considerations have limited the deployment and use of motion capture technology.

Consequently, there is a need for providing the ability to view and/or interact with the real world when using virtual reality capable devices (e.g., wearable or otherwise having greater portability) by capturing the motion of objects in real time without fixed or difficult to configure sensors or markers.

INTRODUCTION

The technology disclosed relates to tracking motion of a wearable sensor system using a combination a RGB (red, green, and blue) and IR (infrared) pixels of one or more cameras. As a result, the technology disclosed captures image data along different portions of the electromagnetic spectrum, including visible, near-IR, and IR bands. This multispectral capture compensates for deficiencies in lighting, contrast, and resolution in different environmental conditions.

In one implementation, the technology disclosed relates to capturing gross or coarse features and corresponding feature values of a real world space using RGB pixels and capturing fine or precise features and corresponding feature values of the real world space using IR pixels. Once captured, motion information of the wearable sensor system with respect to at least one feature of the scene is determined based on comparison between feature values detected at different time instances. For instance, a feature of a real world space is an object at a given position in the real world space, and then the feature value can be the three-dimensional (3D) co-ordinates of the position of the object in the real world space. If, between pairs of image frame or other image volume, the value of the position co-ordinates changes, then this can be used to determine motion information of the wearable sensory system with respect to the object whose position changed between image frames.

In another example, a feature of a real world space is a wall in the real world space and the corresponding feature value is orientation of the wall as perceived by a viewer engaged with a wearable sensor system. In this example, if a change in the orientation of the wall is registered between successive image frames captured by a camera electronically coupled to the wearable sensor system, then this can indicate a change in the position of the wearable sensor system that views the wall.

According to one implementation, RGB pixels of a camera embedded in a wearable sensor system are used to identify an object in the real world space along with prominent or gross features of the object from an image or sequence of images such as object contour, shape, volumetric model, skeletal model, silhouettes, overall arrangement and/or structure of objects in a real world space. This can be achieved by measuring an average pixel intensity of a region or varying textures of regions, as described later in this application. Thus, RGB pixels allow for acquisition of a coarse estimate of the real world space and/or objects in the real world space.

Further, data from the IR pixels can be used to capture fine or precise features of the real world space, which enhance the data extracted from RGB pixels. Examples of fine features include surface textures, edges, curvatures, and other faint features of the real world space and objects in the real world space. In one example, while RGB pixels capture a solid model of a hand, IR pixels are used capture the vein and/or artery patterns or fingerprints of the hand.

Some other implementations can include capturing image data by using the RGB and IR pixels in different combinations and permutations. For example, one implementation can include simultaneously activating the RGB and IR pixels to perform a whole scale acquisition of image data, without distinguishing between coarse or detail features. Another implementation can include using the RGB and IR pixels intermittently. Yet another implementation can include activating the RGB and IR pixels according to a quadratic or Gaussian function. Some other implementations can include performing a first scan using the IR pixels followed by an RGB scan, and vice-versa.

The technology disclosed also relates to enabling multi-user collaboration and interaction in an immersive virtual environment. In particular, it relates to capturing different sceneries of a shared real world space from the perspective of multiple users. In one implementation, this is achieved by capturing video streams of the real world space using cameras embedded in wearable sensor systems engaged by the multiple users. Also, three-dimensional maps of the real world space are determined by extracting one or more feature values of the real world space from image frames captured using a combination of RGB and IR pixels of the respective cameras. Further, position, orientation, and/or velocity of the different users and/or their body portions are determined by calculating the motion information of their wearable sensor systems with respect to each other. This is achieved by comparing the respective three-dimensional maps of the real world space generated from the perspective of different users, according to one implementation.

The technology disclosed further relates to sharing content between wearable sensor systems. In particular, it relates to capturing images and video streams from the perspective of a first user of a wearable sensor system and sending an augmented version of the captured images and video stream to a second user of the wearable sensor system. The augmented version can include corresponding content, with the same capture frame as the original version, but captured from a wider or more encompassing field of view than the original version. The augmented version can be further used to provide a panoramic experience to the second user of the first user's limited view.

In one implementation, the captured content is pre-processed before it is transmitted to a second user. Pre-processing includes enhancing the resolution or contrast of the content or augmenting it with additional graphics, annotations, or comments, according to one implementation. In other implementations, pre-processing includes reducing the resolution of the captured content before transmission.

In one implementation, a wearable sensor system includes capabilities to autonomously create a three-dimensional (3D) map of an environment surrounding a user of a virtual reality device. The map can be advantageously employed to determine motion information of the wearable sensor system and/or another user in the environment. One method includes capturing a plurality of images. A flow can be determined from features identified in captured images. (For example, features in the images corresponding to objects in the real world can be detected. The features of the objects are correlated across multiple images to determine change, which can be represented as a flow.) Based at least in part upon that flow, a map of the environment can be created. The method also includes localizing a user in the environment using the map. Advantageously, processing time can be reduced when a user enters a previously visited portion of the environment, since the device need only scan for new or changed conditions (e.g., that might present hazards, opportunities or points of interest). In one implementation, once a map of the environment has been built, the map can be presented to a virtualizing (VR) system and the virtualizing system can use the map as constraint(s) upon which to construct its world. Accordingly, by employing such techniques, a VR system can enable collaboration between different users participating in collaborative experiences such as multi-user games and other shared space activities.

Implementations of the technology disclosed include methods and systems that enable a user of a wearable (or portable) virtual reality capable device, using a sensor configured to capture motion and/or determining the path of an object based on imaging, acoustic or vibrational waves, to view and/or intuitively interact with the real world. Implementations can enable improved user experience, greater safety, greater functionality to users of virtual reality for machine control and/or machine communications applications using wearable (or portable) devices, e.g., head mounted devices (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection.

In one implementation, a wearable sensor system includes capabilities to provide presentation output to a user of a virtual reality device. For example, a video stream including a sequence of images of a scene in the real world is captured using one or more cameras on a head mounted device (HMD) having a set of RGB pixels and a set of IR pixels. Information from the IR sensitive pixels is separated out for processing to recognize gestures. Information from the RGB sensitive pixels is provided to a presentation interface of the wearable device as a live video feed to a presentation output. The presentation output is displayed to a user of the wearable sensor system. One or more virtual objects can be integrated with the video stream images to form the presentation output. Accordingly, the device is enabled to provide at least one or all or an combination of the following:

1. gesture recognition,
2. a real world presentation of real world objects via pass through video feed, and/or
3. an augmented reality including virtual objects integrated with a real world view.

In one implementation, a wearable sensor system includes capabilities to provide presentation output to a user. For example, in one implementation, the device captures a video stream including a sequence of images of a scene in the real world. The video stream images are integrated with virtual object(s) to form a presentation output. The presentation output is displayed to a user of the wearable sensor system. For example, video can be captured with one or more cameras on a head mounted device (HMD) having a set of RGB pixels and a set of IR pixels.

In one implementation, the ambient lighting conditions are determined and can be used to adjust display of output. For example, information from the set of RGB pixels is displayed in normal lighting conditions and information from the set of IR pixels in dark lighting conditions. Alternatively, or additionally, information from the set of IR pixels can be used to enhance the information from the set of RGB pixels for low-light conditions, or vice versa. Some implementations can receive from a user a selection indicating a preferred display chosen from one of color imagery from the RGB pixels and IR imagery from the IR pixels, or combinations thereof. Alternatively, or additionally, the device itself may dynamically switch between video information captured using RGB sensitive pixels and video information captured using IR sensitive pixels for display depending upon ambient conditions, user preferences, situational awareness, other factors, or combinations thereof.

In one implementation, information from the IR sensitive pixels is separated out for processing to recognize gestures; while the information from the RGB sensitive pixels is provided to an output as a live video feed; thereby enabling conserving bandwidth to the gesture recognition processing. In gesture processing, features in the images corresponding to objects in the real world can be detected. The features of the objects are correlated across multiple images to determine change, which can be correlated to gesture motions. The gesture motions can be used to determine command information to a machine under control, application resident thereon or combinations thereof.

In one implementation, motion sensors and/or other types of sensors are coupled to a motion-capture system to monitor motion of at least the sensor of the motion-capture system resulting from, for example, users' touch. Information from the motion sensors can be used to determine first and second positional information of the sensor with respect to a fixed point at first and second times. Difference information between the first and second positional information is determined. Movement information for the sensor with respect to the fixed point is computed based upon the difference information. The movement information for the sensor is applied to apparent environment information sensed by the sensor to remove motion of the sensor therefrom to yield actual environment information; which can be communicated. Control information can be communicated to a system configured to provide a virtual reality or augmented reality experience via a portable device and/or to systems controlling machinery or the like based upon motion capture information for an object moving in space derived from the sensor and adjusted to remove motion of the sensor itself. In some applications, a virtual device experience can be augmented by the addition of haptic, audio and/or visual projectors.

In an implementation, apparent environmental information is captured from positional information of an object portion at the first time and the second time using a sensor of the motion-capture system. Object portion movement information relative to the fixed point at the first time and the second time is computed based upon the difference information and the movement information for the sensor.

In further implementations, a path of the object is calculated by repeatedly determining movement information for the sensor, using the motion sensors, and the object portion, using the sensor, at successive times and analyzing a sequence of movement information to determine a path of the object portion with respect to the fixed point. Paths can be compared to templates to identify trajectories. Trajectories of body parts can be identified as gestures. Gestures can indicate command information to be communicated to a system. Some gestures communicate commands to change operational modes of a system (e.g., zoom in, zoom out, pan, show more detail, next display page, and so forth).

Advantageously, some implementations can enable improved user experience, greater to safety and improved functionality for users of virtual reality wearable devices. Some implementations further provide gesture capability allowing the user to execute intuitive gestures involving virtualized contact with a virtual object. For example, a device can be provided a capability to distinguish motion of objects from motions of the device itself in order to facilitate proper gesture recognition. Some implementations can provide improved interfacing with a variety of portable or wearable machines (e.g., smart telephones, portable computing systems, including laptop, tablet computing devices, personal data assistants, special purpose visualization computing machinery, including heads up displays (HUDs) for use in aircraft or automobiles for example, wearable virtual and/or augmented reality systems, including Google Glass, and others, graphics processors, embedded microcontrollers, gaming consoles, or the like; wired or wirelessly coupled networks of one or more of the foregoing, and/or combinations thereof), obviating or reducing the need for contact-based input devices such as a mouse, joystick, touch pad, or touch screen. Some implementations can provide for improved interface with computing and/or other machinery than would be possible with heretofore known techniques. In some implementations, a richer human—machine interface experience can be provided.

Other aspects and advantages of the present technology can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
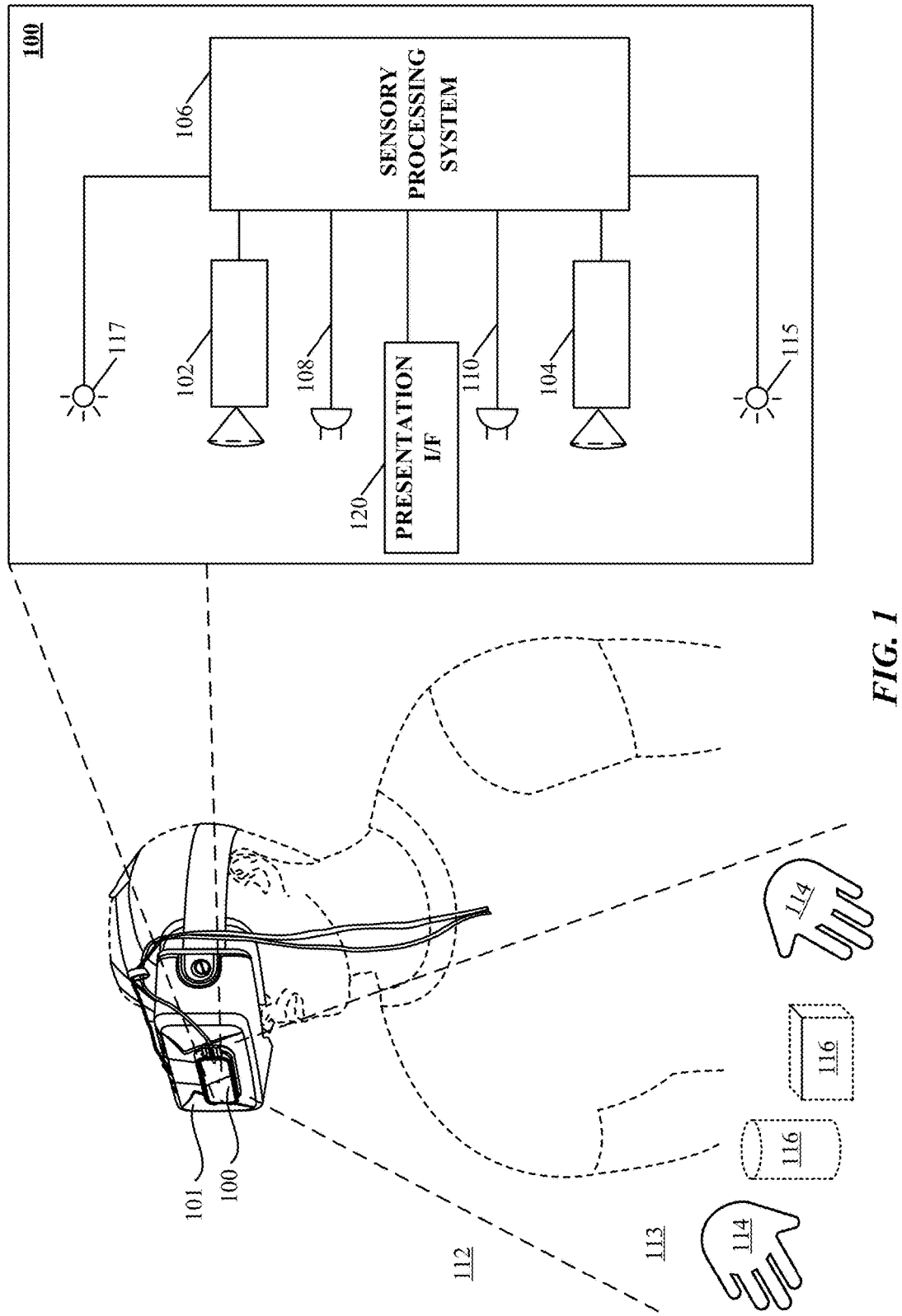
FIG. 1 illustrates a system for capturing image and other sensory data according to an implementation of the technology disclosed.

Among other aspects, the technology described herein with reference to example implementations can provide capabilities to view and/or interact with the real world to the user of a wearable (or portable) device using a sensor or sensors configured to capture motion and/or determining the path of an object based on imaging, acoustic or vibrational waves. Implementations can enable improved user experience, greater safety, greater functionality to users of virtual reality for machine control and/or machine communications applications using wearable (or portable) devices, e.g., head mounted devices (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection. In some implementations, projection techniques can supplement the sensory based tracking with presentation of virtual (or virtualized real) objects (visual, audio, haptic, and so forth) created by applications loadable to, or in cooperative implementation with, the HMD or other device to provide a user of the device with a personal virtual experience (e.g., a functional equivalent to a real experience).

Implementations include providing a "pass-through" in which live video is provided to the user of the virtual reality device, either alone or in conjunction with display of one or more virtual objects, enabling the user to perceive the real world directly. Accordingly, the user is enabled to see an actual desk environment as well as virtual applications or objects intermingled therewith. Gesture recognition and sensing enables implementations to provide the user with the ability to grasp or interact with real objects (e.g., the user's coke can) alongside the virtual (e.g., a virtual document floating above the surface of the user's actual desk. In some implementations, information from differing spectral sources is selectively used to drive one or another aspect of the experience. For example, information from IR sensitive sensors can be used to detect the user's hand motions and recognize gestures. While information from the visible light region can be used to drive the pass through video presentation, creating a real world presentation of real and virtual objects. In a further example, combinations of image information from multiple sources can be used; the system—or the user—selecting between IR imagery and visible light imagery based upon situational, conditional, environmental or other factors or combinations thereof. For example, the device can switch from visible light imaging to IR imaging when the ambient light conditions warrant. The user can have the ability to control the imaging source as well. In yet further examples, information from one type of sensor can be used to augment, correct, or corroborate information from another type of sensor. Information from IR sensors can be used to correct the display of imaging conducted from visible light sensitive sensors, and vice versa. In low-light or other situations not conducive to optical imaging, where free-form gestures cannot be recognized optically with a sufficient degree of reliability, audio signals or vibrational waves can be detected and used to supply the direction and location of the object as further described herein.

The technology disclosed can be applied to enhance user experience in immersive virtual reality environments using wearable sensor systems. Examples of systems, apparatus, and methods according to the disclosed implementations are described in a "wearable sensor systems" context. The examples of "wearable sensor systems" are being provided solely to add context and aid in the understanding of the disclosed implementations. In other instances, examples of gesture-based interactions in other contexts like automobiles, robots, or other machines can be applied to virtual games, virtual applications, virtual programs, virtual operating systems, etc. Other applications are possible, such that the following examples should not be taken as definitive or limiting either in scope, context, or setting. It will thus be apparent to one skilled in the art that implementations can be practiced in or outside the "wearable sensor systems" context.

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" the predecessor signal, event or value. "Responsiveness" or "dependency" or "basis" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Refer first to FIG. 1, which illustrates a system 100 for capturing image data according to one implementation of the technology disclosed. System 100 is preferably coupled to a wearable device 101 that can be a personal head mounted device (HMD) having a goggle form factor such as shown in FIG. 1, a helmet form factor, or can be incorporated into or coupled with a watch, smartphone, or other type of portable device.

In various implementations, the system and method for capturing 3D motion of an object as described herein can be integrated with other applications, such as a HMD or a mobile device. Referring again to FIG. 1, a HMD 101 can include an optical assembly that displays a surrounding environment or a virtual environment to the user; incorporation of the motion-capture system 100 in the HMD 101 allows the user to interactively control the displayed environment. For example, a virtual environment can include virtual objects that can be manipulated by the user's hand gestures, which are tracked by the motion-capture system 100. In one implementation, the motion-capture system 100 integrated with the HMD 101 detects a position and shape of user's hand and projects it on the display of the head mounted device 100 such that the user can see her gestures and interactively control the objects in the virtual environment. This can be applied in, for example, gaming or internet browsing.

System 100 includes any number of cameras 102, 104 coupled to sensory processing system 106. Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second), although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 102, 104 can be oriented toward portions of a region of interest 112 by motion of the device 101, in order to view a virtually rendered or virtually augmented view of the region of interest 112 that can include a variety of virtual objects 116 as well as contain an object of interest 114 (in this example, one or more hands) moves within the region of interest 112. One or more sensors 108, 110 capture motions of the device 101. In some implementations, one or more light sources 115, 117 are arranged to illuminate the region of interest 112. In some implementations, one or more of the cameras 102, 104 are disposed opposite the motion to be detected, e.g., where the hand 114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 106, which can be, e.g., a computer system, can control the operation of cameras 102, 104 to capture images of the region of interest 112 and sensors 108, 110 to capture motions of the device 101. Information from sensors 108, 110 can be applied to models of images taken by cameras 102, 104 to cancel out the effects of motions of the device 101, providing greater accuracy to the virtual experience rendered by device 101. Based on the captured images and motions of the device 101, sensory processing system 106 determines the position and/or motion of object 114.

For example, as an action in determining the motion of object 114, sensory processing system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 102, 104 and cancelling out captured motions of the device 101 from sensors 108, 110 allows sensory processing system 106 to determine the location in 3D space of object 114, and analyzing sequences of images allows sensory processing system 106 to reconstruct 3D motion of object 114 using conventional motion algorithms or other techniques. See, e.g., U.S. patent application Ser. No. 13/414,485, filed on Mar. 7, 2012 and Ser.

No. 13/742,953, filed on Jan. 16, 2013, and U.S. Provisional Patent Application No. 61/724,091, filed on Nov. 8, 2012, which are hereby incorporated herein by reference in their entirety.

Presentation interface 120 employs projection techniques in conjunction with the sensory based tracking in order to present virtual (or virtualized real) objects (visual, audio, haptic, and so forth) created by applications loadable to, or in cooperative implementation with, the device 101 to provide a user of the device with a personal virtual experience. Projection can include an image or other visual representation of an object.

Figure 8:
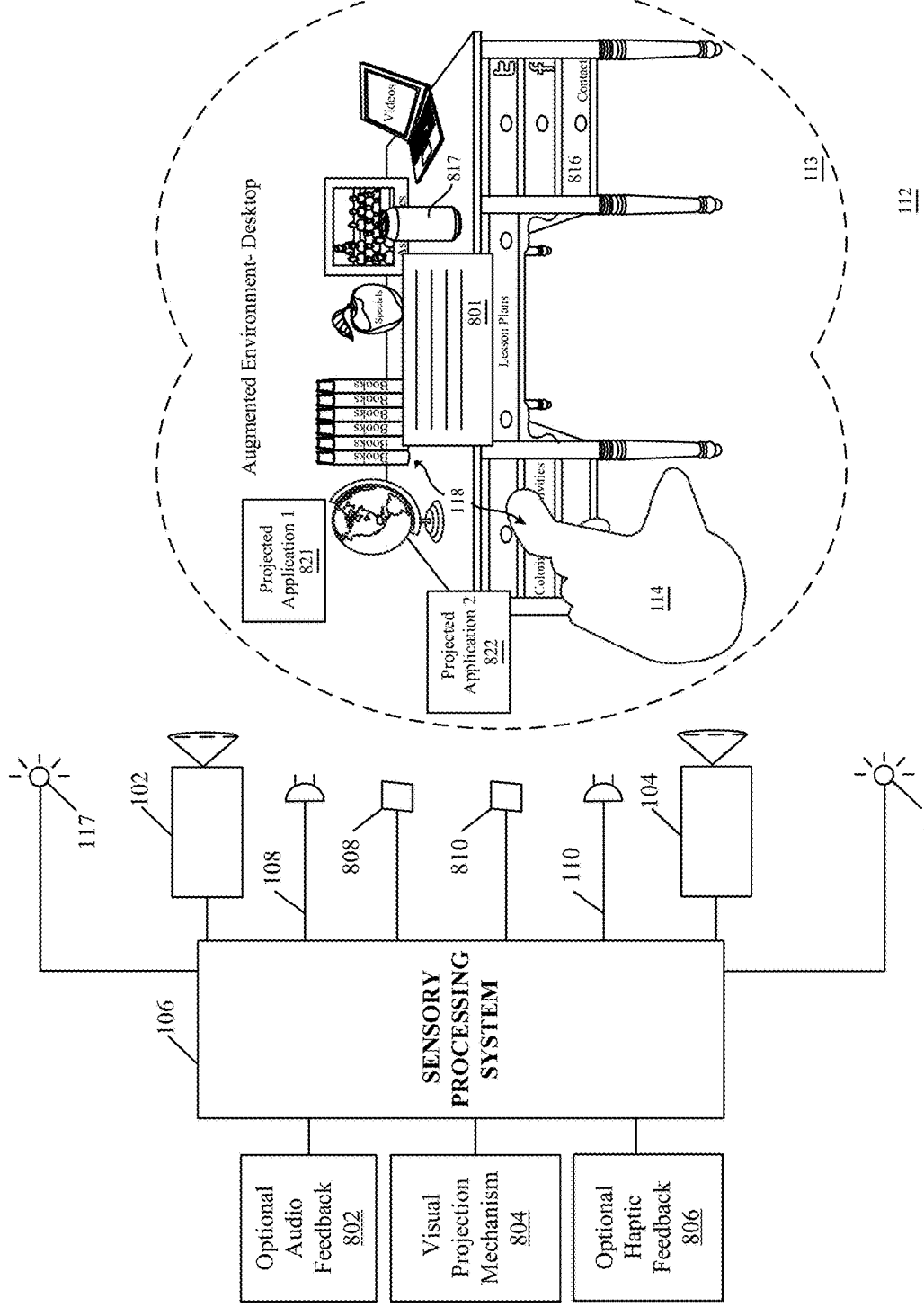
FIG. 8 illustrates one implementation of a system for providing a virtual device experience.

One implementation uses motion sensors and/or other types of sensors coupled to a motion-capture system to monitor motions within a real environment. A virtual object integrated into an augmented rendering of a real environment can be projected to a user of a portable device 101. Motion information of a user body portion can be determined based at least in part upon sensory information received from imaging devices (e.g. cameras 102, 104) or acoustic or other sensory devices. Control information is communicated to a system based in part on a combination of the motion of the portable device 101 and the detected motion of the user determined from the sensory information received from imaging devices (e.g. cameras 102, 104) or acoustic or other sensory devices. The virtual device experience can be augmented in some implementations by the addition of haptic, audio and/or other sensory information projectors. For example, with reference to FIG. 8, optional video projector 120 can project an image of a page (e.g., virtual device 801) from a virtual book object superimposed upon a real world object, e.g., desk 116 being displayed to a user via live video feed; thereby creating a virtual device experience of reading an actual book, or an electronic book on a physical e-reader, even though no book nor e-reader is present. Optional haptic projector 806 can project the feeling of the texture of the "virtual paper" of the book to the reader's finger. Optional audio projector 802 can project the sound of a page turning in response to detecting the reader making a swipe to turn the page. Because it is a virtual reality world, the back side of hand 114 is projected to the user, so that the scene looks to the user as if the user is looking at the user's own hand(s).

A plurality of sensors 108, 110 coupled to the sensory processing system 106 to capture motions of the device 101. Sensors 108, 110 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 100 can include any of various other sensors not shown in FIG. 1 for clarity, alone or in various combinations, to enhance the virtual experience provided to the user of device 101. For example, in low-light situations where free-form gestures cannot be recognized optically with a sufficient degree of reliability, system 106 may switch to a touch mode in which touch gestures are recognized based on acoustic or vibrational sensors. Alternatively, system 106 may switch to the touch mode, or supplement image capture and processing with touch sensing, when signals from acoustic or vibrational sensors are sensed. In still another operational mode, a tap or touch gesture may act as a "wake up" signal to bring the sensory processing system 106 from a standby mode to an operational mode. For example, the system 106 may enter the standby mode if optical signals from the cameras 102, 104 are absent for longer than a threshold interval.

It will be appreciated that the figures shown in FIG. 1 are illustrative. In some implementations, it may be desirable to house the system 100 in a differently shaped enclosure or integrated within a larger component or assembly. Furthermore, the number and type of image sensors, motion detectors, illumination sources, and so forth are shown schematically for the clarity, but neither the size nor the number is the same in all implementations.

Figure 2:
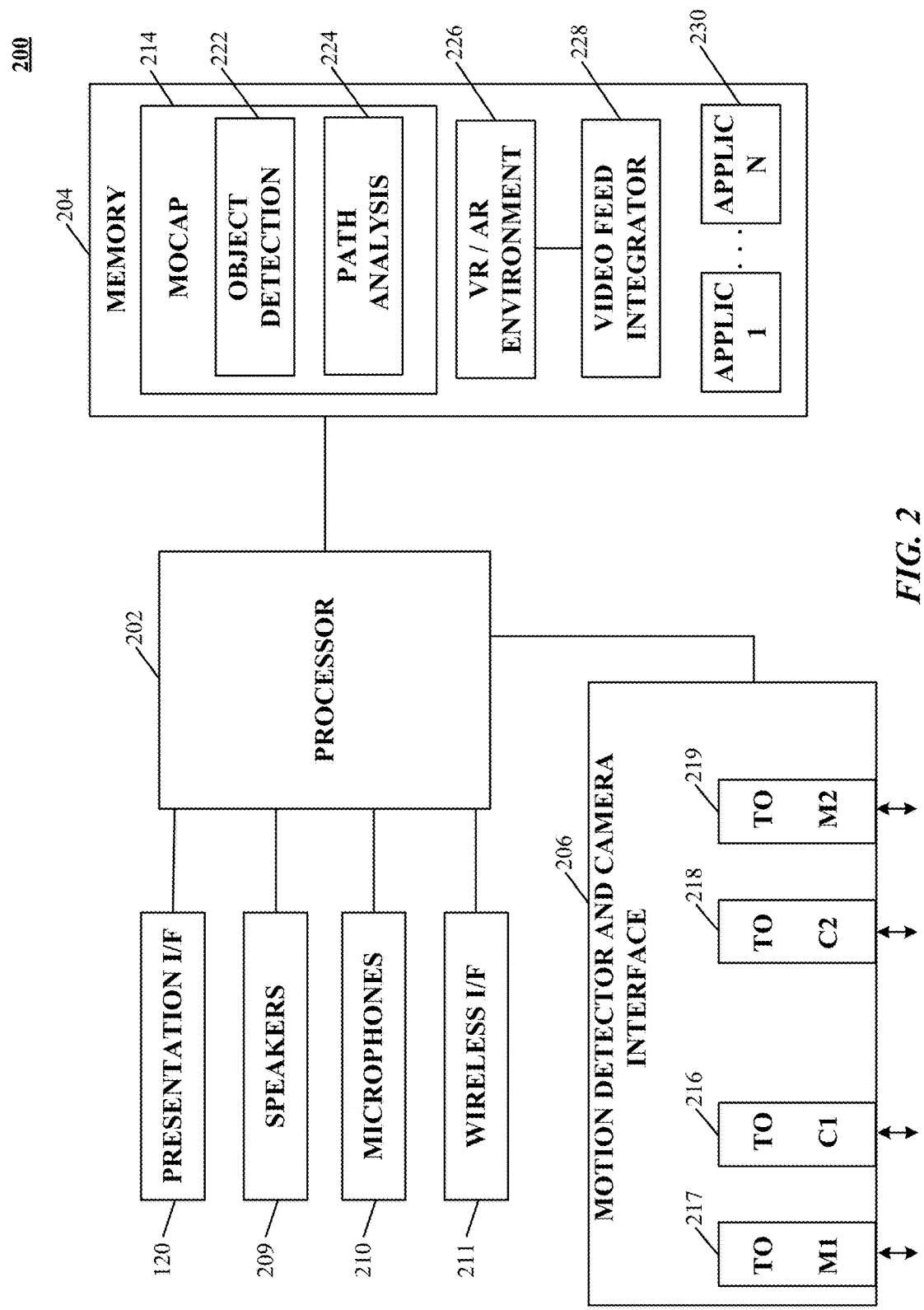
FIG. 2 is a simplified block diagram of a computer system implementing image analysis suitable for supporting a virtual environment enabled apparatus according to an implementation of the technology disclosed.

Refer now to FIG. 2, which shows a simplified block diagram of a computer system 200 for implementing sensory processing system 106. Computer system 200 includes a processor 202, a memory 204, a motion detector and camera interface 206, a presentation interface 120, speaker(s) 209, a microphone(s) 210, and a wireless interface 211. Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/ non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Motion detector and camera interface 206 can include hardware and/or software that enables communication between computer system 200 and cameras 102, 104, as well as sensors 108, 110 (see FIG. 1). Thus, for example, motion detector and camera interface 206 can include one or more camera data ports 216, 218 and motion detector ports 217, 219 to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a motion-capture ("mocap") program 214 executing on processor 202. In some implementations, motion detector and camera interface 206 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 202, which may in turn be generated in response to user input or other detected events.

Instructions defining mocap program 214 are stored in memory 204, and these instructions, when executed, perform motion-capture analysis on images supplied from cameras and audio signals from sensors connected to motion detector and camera interface 206. In one implementation, mocap program 214 includes various modules, such as an object analysis module 222 and a path analysis module 224. Object analysis module 222 can analyze images (e.g., images captured via interface 206) to detect edges of an object therein and/or other information about the object's location. In some implementations, object analysis module 222 can also analyze audio signals (e.g., audio signals captured via interface 206) to localize the object by, for example, time distance of arrival, multilateration or the like. ("Multilateration is a navigation technique based on the measurement of the difference in distance to two or more stations at known locations that broadcast signals at known times. See Wikipedia, at <http://en.wikipedia.org/w/index.php?title=Multilateration&oldid=523281858>, on Nov. 16, 2012, 06:07 UTC). Path analysis module 224 can track and predict object movements in 3D based on information obtained via the cameras. Some implementations will include a Virtual Reality/Augmented Reality environment manager 226 provides integration of virtual objects reflecting real objects (e.g., hand 114) as well as synthesized objects 116 for presentation to user of device 101 via presentation interface 120 to provide a personal virtual experience. One or more applications 230 can be loaded into memory 204 (or otherwise made available to processor 202) to augment or customize functioning of device 101 thereby enabling the system 200 to function as a platform. Successive camera images are analyzed at the pixel level to extract object movements and velocities. Audio signals place the object on a known surface, and the strength and variation of the signals can be used to detect object's presence. If both audio and image information is simultaneously available, both types of information can be analyzed and reconciled to produce a more detailed and/or accurate path analysis. A video feed integrator 228 provides integration of live video feed from the cameras 102, 104 and one or more virtual objects (e.g., 801 of FIG. 8) using techniques like that of flowchart 1100 of FIG. 11. Video feed integrator governs processing of video information from disparate types of cameras 102, 104. For example, information received from pixels sensitive to IR light and from pixels sensitive to visible light (e.g., RGB) can be separated by integrator 228 and processed differently. Image information from IR sensors can be used for gesture recognition, while image information from RGB sensors can be provided as a live video feed via presentation interface 120. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user. Integrator 228 in conjunction with VR/AR environment 226 control the creation of the environment presented to the user via presentation interface 120.

Presentation interface 120, speakers 209, microphones 210, and wireless network interface 211 can be used to facilitate user interaction via device 101 with computer system 200. These components can be of generally conventional design or modified as desired to provide any type of user interaction. In some implementations, results of motion capture using motion detector and camera interface 206 and mocap program 214 can be interpreted as user input. For example, a user can perform hand gestures or motions across a surface that are analyzed using mocap program 214, and the results of this analysis can be interpreted as an instruction to some other program executing on processor 202 (e.g., a web browser, word processor, or other application). Thus, by way of illustration, a user might use upward or downward swiping gestures to "scroll" a webpage currently displayed to the user of device 101 via presentation interface 120, to use rotating gestures to increase or decrease the volume of audio output from speakers 209, and so on. Path analysis module 224 may represent the detected path as a vector and extrapolate to predict the path, e.g., to improve rendering of action on device 101 by presentation interface 120 by anticipating movement.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of object detection module 222 by processor 202 can cause processor 202 to operate motion detector and camera interface 206 to capture images and/or audio signals of an object traveling across and in contact with a surface to detect its entrance by analyzing the image and/or audio data.

Figure 3A:
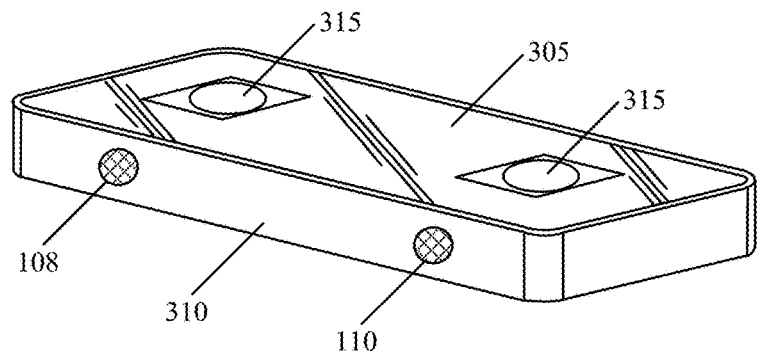
FIG. 3A is a perspective view from the top of a sensor in accordance with the technology disclosed, with motion sensors along an edge surface thereof.
Figure 3B:
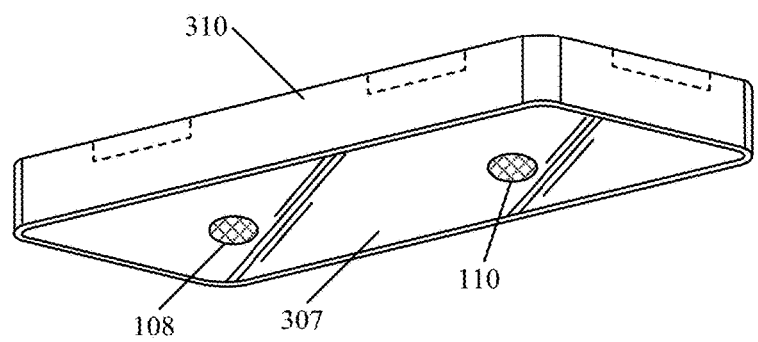
FIG. 3B is a perspective view from the bottom of a sensor in accordance with the technology disclosed, with motion sensors along the bottom surface thereof.
Figure 3C:
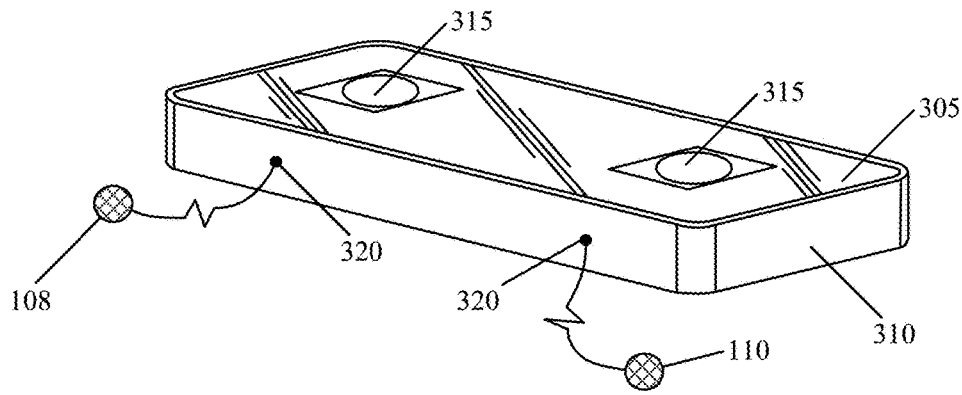
FIG. 3C is a perspective view from the top of a sensor in accordance with the technology disclosed, with detachable motion sensors configured for placement on a surface.

FIGS. 3A, 3B, and 3C illustrate three different configurations of a movable sensor system 300A, 300B, and 300C, with reference to example implementations packaged within a single housing as an integrated sensor. In all cases, sensor 300A, 300B, 300C includes a top surface 305, a bottom surface 307, and a side wall 310 spanning the top and bottom surfaces 305, 307. With reference also to FIG. 3A, the top surface 305 of sensor 300A contains a pair of windows 315 for admitting light to the cameras 102, 104, one of which is optically aligned with each of the windows 315. If the system includes light sources 115, 117, surface 305 may contain additional windows for passing light to the object(s) being tracked. In sensor 300A, motion sensors 108, 110 are located on the side wall 310. Desirably, the motion sensors are flush with the surface of side wall 310 so that, the motion sensors are disposed to sense motions about a longitudinal axis of sensor 300A. Of course, the motion sensors can be recessed from side wall 310 internal to the device in order to accommodate sensor operation and placement within available packaging space so long as coupling with the external housing of sensor 300A remains adequate. In sensor 300B, motion sensors 108, 110 are located proximate to the bottom surface 307, once again in a flush or recessed configuration. The top surface of the sensor 300B (not shown in the figure for clarity sake) contains camera windows 315 as shown in FIG. 3A. In FIG. 3C, motion sensors 108, 110 are external contact transducers that connect to sensor 300C via jacks 320. This configuration permits the motion sensors to be located away from the sensor 300C, e.g., if the motion sensors are desirably spaced further apart than the packaging of sensor 300C allows. In other implementations, movable sensor components of FIGS. 3A, 3B and 3C can be imbedded in portable (e.g., head mounted devices (HMDs), wearable goggles, watch computers, smartphones, and so forth) or movable (e.g., autonomous robots, material transports, automobiles (human or machine driven)) devices.

Figure 4:
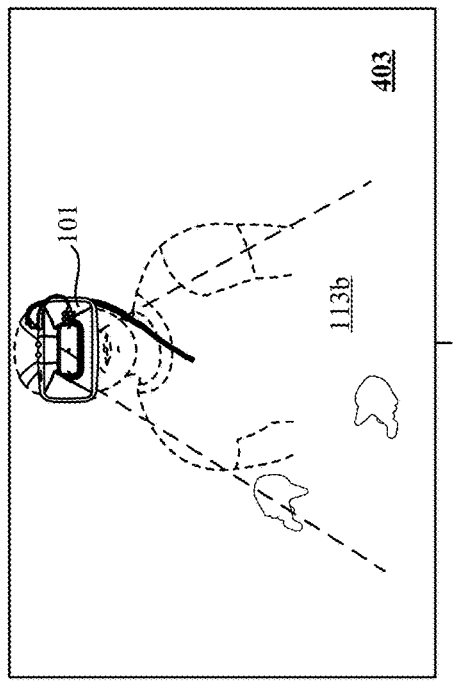
FIG. 4 illustrates apparent movement of objects from the perspective of the user of a virtual environment enabled apparatus in accordance with the technology disclosed.
Figure 4:
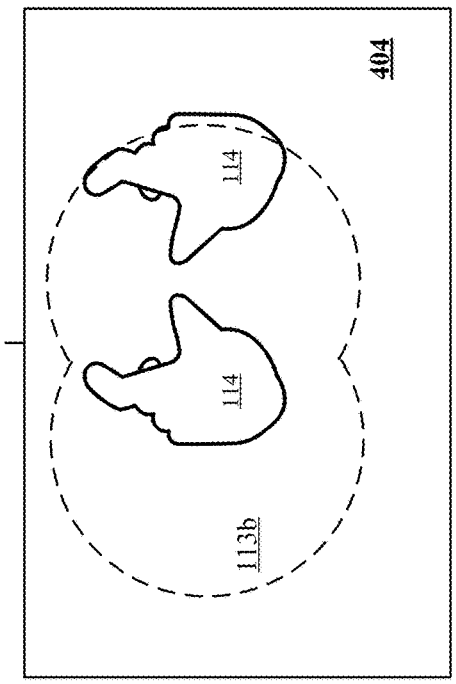
Figure 4:
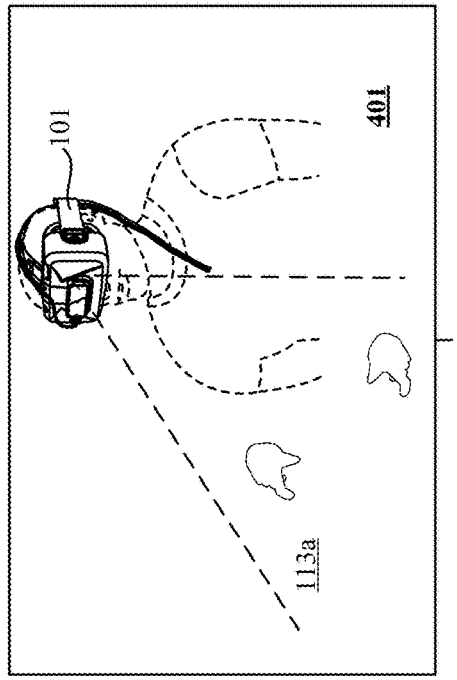
Figure 4:
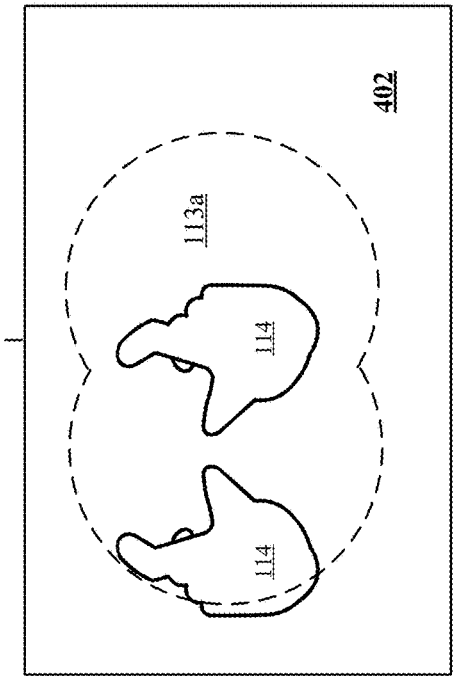

FIG. 4 illustrates apparent movement of objects from the perspective of the user of a virtual environment enabled apparatus 400 in accordance with the technology. FIG. 4 shows two views of a user of a device 101 viewing a field of view 113 at two different times. As shown in block 401, at an initial time $t_0$, user is viewing field of view 113a using device 101 in a particular initial position to view an area 113a. As shown in block 402, device 101 presents to user a display of the device field of view 113a that includes objects 114 (hands) in a particular pose. As shown in block 403, subsequently at time $t_1$, the user has repositioned device 101. Accordingly, the apparent position of objects 114 in the field of view 113b shown in block 404 has changed from the apparent position of the objects 114 in field of view 113a. Even in the case where the hands 114 did not move in space, the user sees an apparent movement of the hands 114 due to the change in position of the device.

Figure 5:
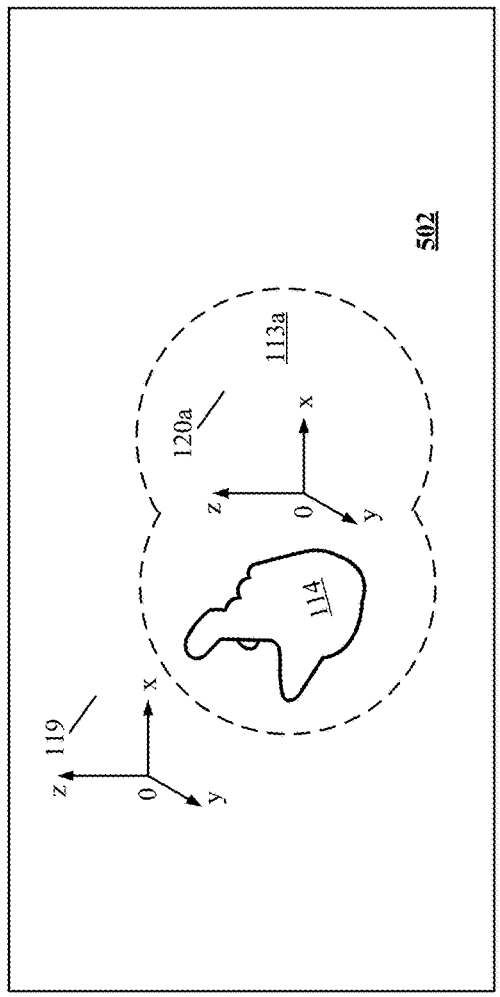
FIG. 5 illustrates apparent movement of objects from the perspective of the user of a virtual environment enabled apparatus in accordance with the technology disclosed.
Figure 5:
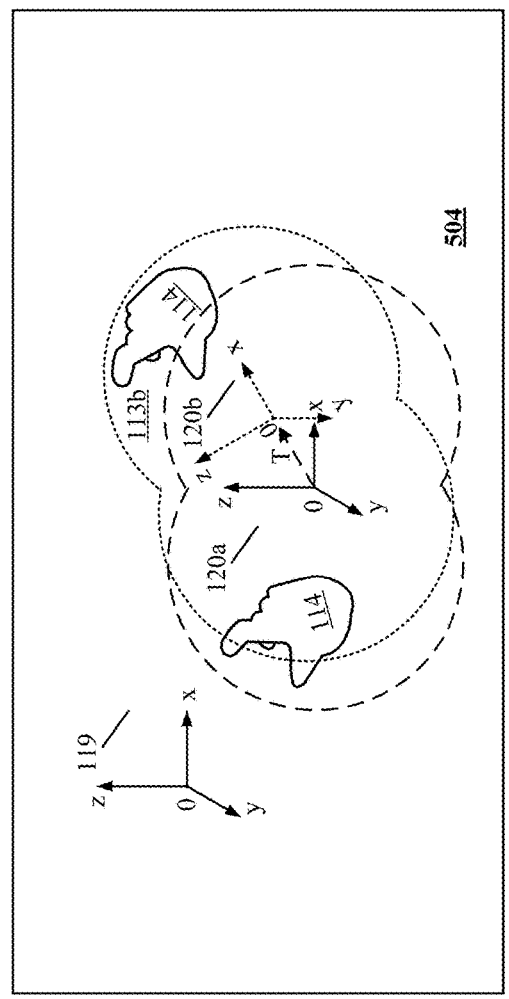

Now with reference to FIG. 5, an apparent movement of one or more moving objects from the perspective of the user of a virtual environment enabled apparatus 500 is illustrated. As shown by block 502, field of view 113a presented by device 101 at time $t_0$ includes an object 114. At time $t_0$, the position and orientation of tracked object 114 is known with respect to device reference frame 120a, again at time $t_0$. As shown by block 404, at time $t_1$, the position and orientation of both device reference frame 120b and tracked object 114 have changed. As shown by block 504, field of view 113b presented by device 101 at time $t_1$ includes object 114 in a new apparent position. Because the device 101 has moved, the device reference frame 120 has moved from an original or starting device reference frame 120a to a current or final reference frame 120b as indicated by transformation T. It is noteworthy that the device 101 can rotate as well as translate. Implementations can provide sensing the position and rotation of reference frame 120b with respect to reference frame 120a and sensing the position and rotation of tracked object 114 with respect to 120b, at time $t_1$. Implementations can determine the position and rotation of tracked object 114 with respect to 120a from the sensed position and rotation of reference frame 120b with respect to reference frame 120a and the sensed position and rotation of tracked object 114 with respect to 120b.

In an implementation, a transformation R is determined that moves dashed line reference frame 120a to dotted line reference frame 120b, without intermediate conversion to an absolute or world frame of reference. Applying the reverse transformation $R^T$ makes the dotted line reference frame 120b lie on top of dashed line reference frame 120a. Then the tracked object 114 will be in the right place from the point of view of dashed line reference frame 120a. (It is noteworthy that $R^T$ is equivalent to $R^{-1}$ for our purposes.) In determining the motion of object 114, sensory processing system 106 can determine its location and direction by computationally analyzing images captured by cameras 102, 104 and motion information captured by sensors 108, 110. For example, an apparent position of any point on the object (in 3D space) at time t=

$$t_0: \begin{bmatrix} x \\ y \\ z \\ 1 \end{bmatrix},$$

can be converted to a real position of the point on the object at time $$t = t_1: \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}$$

from the frame of reference of the device. We refer to the combination of a rotation and translation, which are not generally commutative, as the affine transformation.

The correct location at time $t=t_1$ of a point on the tracked object with respect to device reference frame 120a is given by an inverse affine transformation, e.g., $$\begin{bmatrix} R_{ref}^T & -R_{ref}^T * T_{ref} \\ 0 & 1 \end{bmatrix}$$

as provided for in equation (1):

$$\begin{bmatrix} R_{ref}^T & (-R_{ref}^T)*T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (1)$$

Where:
$R_{ref}^T$— Represents the rotation matrix part of an affine transform describing the rotation transformation from the device reference frame 120a to the device reference frame 120b.
$T_{ref}$—Represents translation of the device reference frame 120a to the device reference frame 120b.

One conventional approach to obtaining the Affine transform R (from axis unit vector u=($u_x$, $u_y$, $u_z$), rotation angle θ) method. Wikipedia, at <http://en.wikipedia.org/wiki/Rotation_matrix>, Rotation matrix from axis and angle, on Jan. 30, 2014, 20:12 UTC, upon which the computations equation (2) are at least in part inspired:

$$R = \begin{bmatrix} \cos\theta + u_x^2(1-\cos\theta) & u_xu_y(1-\cos\theta) - u_z\sin\theta & u_xu_z(1-\cos\theta) + u_y\sin\theta \\ u_yu_x(1-\cos\theta) + u_z\sin\theta & \cos\theta + u_y^2(1-\cos\theta) & u_yu_z(1-\cos\theta) - u_x\sin\theta \\ u_zu_x(1-\cos\theta) - u_y\sin\theta & u_zu_y(1-\cos\theta) + u_x\sin\theta & \cos\theta + u_z^2(1-\cos\theta) \end{bmatrix} \quad (2)$$

$$R^T = \begin{bmatrix} \cos\theta + u_x^2(1-\cos\theta) & u_yu_x(1-\cos\theta) + u_z\sin\theta & u_zu_x(1-\cos\theta) - u_y\sin\theta \\ u_xu_y(1-\cos\theta) - u_z\sin\theta & \cos\theta + u_y^2(1-\cos\theta) & u_zu_y(1-\cos\theta) + u_x\sin\theta \\ u_xu_z(1-\cos\theta) + u_y\sin\theta & u_yu_z(1-\cos\theta) - u_x\sin\theta & \cos\theta + u_z^2(1-\cos\theta) \end{bmatrix}$$

$$-R^T = \begin{bmatrix} -\cos\theta - u_x^2(1-\cos\theta) & -u_yu_x(1-\cos\theta) - u_z\sin\theta & -u_zu_x(1-\cos\theta) + u_y\sin\theta \\ -u_xu_y(1-\cos\theta) + u_z\sin\theta & -\cos\theta - u_y^2(1-\cos\theta) & -u_zu_y(1-\cos\theta) - u_x\sin\theta \\ -u_xu_z(1-\cos\theta) - u_y\sin\theta & -u_yu_z(1-\cos\theta) + u_x\sin\theta & -\cos\theta - u_z^2(1-\cos\theta) \end{bmatrix}$$

$$T = \begin{bmatrix} a \\ b \\ c \end{bmatrix}$$

is a vector representing a translation of the object with respect to origin of the coordinate system of the translated frame, $$-R^T * T = \begin{bmatrix} (-\cos\theta - u_x^2(1-\cos\theta))(a) + (-\cos\theta - u_y^2(1-\cos\theta))(b) + (-u_zu_x(1-\cos\theta) + u_y\sin\theta)(c) \\ (-u_xu_y(1-\cos\theta) + u_z\sin\theta)(a) + (-\cos\theta - u_y^2(1-\cos\theta))(b) + (-u_zu_y(1-\cos\theta) - u_x\sin\theta)(c) \\ (-u_xu_z(1-\cos\theta) - u_y\sin\theta)(a) + (-u_yu_z(1-\cos\theta) + u_x\sin\theta)(b) + (-\cos\theta - u_z^2(1-\cos\theta))(c) \end{bmatrix}$$

In another example, an apparent orientation and position of the object at time t=$t_0$: vector pair $$\begin{bmatrix} R_{obj} & T_{obj} \\ 0 & 1 \end{bmatrix},$$

can be converted to a real orientation and position of the object at time $$t = t_1: \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

The correct orientation and position of the tracked object with respect to device reference frame at time t=$t_0$ (120a) is given by an inverse affine transformation, e.g., $$\begin{bmatrix} R_{ref}^T & -R_{ref}^T * T_{ref} \\ 0 & 1 \end{bmatrix}$$

as provided for in equation (3):

$$\begin{bmatrix} R_{ref}^T & (-R_{ref}^T)*T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (3)$$

Where:
$R_{ref}^T$—Represents the rotation matrix part of an affine transform describing the rotation transformation from the device reference frame 120a to the device reference frame 120b.

$R_{obj}$—Represents a matrix describing the rotation at $t_0$ of the object with respect to the device reference frame 120b.

$R'_{obj}$—Represents a matrix describing the rotation at $t_1$ of the object with respect to the device reference frame 120a.

$T_{ref}$—Represents a vector translation of the device reference frame 120a to the device reference frame 120b.

$T_{obj}$—Represents a vector describing the position at $t_0$ of the object with respect to the device reference frame 120b.

$T'_{obj}$—Represents a vector describing the position at $t_1$ of the object with respect to the device reference frame 120a.

In a yet further example, an apparent orientation and position of the object at time $t=t_0$: affine transform $$\begin{bmatrix} R_{obj} & T_{obj} \\ 0 & 1 \end{bmatrix},$$

can be converted to a real orientation and position of the object at time $$t = t_1: \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

Furthermore, the position and orientation of the initial reference frame with respect to a (typically) fixed reference point in space can be determined using an affine transform $$\begin{bmatrix} R_{init} & T_{init} \\ 0 & 1 \end{bmatrix}.$$

The correct orientation and position of the tracked object with respect to device reference frame at time $t=t_0$ (120a) is given by an inverse affine transformation, e.g., $$\begin{bmatrix} R_{init}^T & (-R_{init}^T) * T_{init} \\ 0 & 1 \end{bmatrix}$$

as provided for in equation (4):

$$\begin{bmatrix} R_{init}^T & (-R_{init}^T) * T_{init} \\ 0 & 1 \end{bmatrix} \begin{bmatrix} R_{ref}^T & (-R_{ref}^T) * T_{ref} \\ 0 & 1 \end{bmatrix} * \begin{bmatrix} R_{onj} & T_{obj} \\ 0 & 1 \end{bmatrix} = \begin{bmatrix} R'_{obj} & T'_{obj} \\ 0 & 1 \end{bmatrix} \quad (4)$$

Where:

$R^T_{init}$—Represents a rotation matrix part of an affine transform describing the rotation transformation at $t_0$ from the world reference frame 119 to the device reference frame 120a.

$R^T_{ref}$—Represents the rotation matrix part of an affine transform describing the rotation transformation from the device reference frame 120a to the device reference frame 120b.

$R_{obj}$ Represents a matrix describing the rotation of the object at $t_0$ with respect to the device reference frame 120b.

$R'_{obj}$—Represents a matrix describing the rotation of the object at $t_1$ with respect to the device reference frame 120a.

$T_{init}$—Represents a vector translation at $t_0$ of the world reference frame 119 to the device reference frame 120a.

$T_{ref}$—Represents a vector translation at $t_1$ of the device reference frame 120a to the device reference frame 120b.

$T_{obj}$—Represents a vector describing the position at $t_0$ of the object with respect to the device reference frame 120b.

$T'_{obj}$—Represents a vector describing the position at $t_1$ of the object with respect to the device reference frame 120a.

In some implementations, the technology disclosed can build a world model with an absolute or world frame of reference. The world model can include representations of object portions (e.g. objects, edges of objects, prominent vortices) and potentially depth information when available from a depth sensor, depth camera or the like, within the viewpoint of the virtual or augmented reality head mounted sensor. The system can build the world model from image information captured by the cameras of the sensor. Points in 3D space can be determined from the stereo-image information are analyzed to obtain object portions. These points are not limited to a hand or other control object in a foreground; the points in 3D space can include stationary background points, especially edges. The model is populated with the object portions.

When the sensor moves (e.g., the wearer of a wearable headset turns her head) successive stereo-image information is analyzed for points in 3D space. Correspondences are made between two sets of points in 3D space chosen from the current view of the scene and the points in the world model to determine a relative motion of the object portions. The relative motion of the object portions reflects actual motion of the sensor.

Differences in points are used to determine an inverse transformation $$\text{(the } \begin{bmatrix} R^T & -R^T * T \\ 0 & 1 \end{bmatrix} \text{)}$$

between model position and new position of object portions. In this affine transform, $R^T$ describes the rotational portions of motions between camera and object coordinate systems, and T describes the translational portions thereof.

The system then applies an inverse transformation of the object corresponding to the actual transformation of the device (since the sensor, not the background object moves) to determine the translation and rotation of the camera. Of course, this method is most effective when background objects are not moving relative to the world frame (i.e., in free space).

The model can be updated whenever we detect new points not previously seen in the model. The new points are added to the model so that it continually grows.

Of course, embodiments can be created in which (1) device cameras are considered stationary and the world model is considered to move; or (2) the device cameras are considered to be moving and the world model is considered stationary.

The use of a world model described above does not require any gyroscopic, accelerometer or magnetometer sensors, since the same cameras in a single unit (even the same cameras) can sense both the background objects and the control object. In any view where the system can recognize elements of the model, it can re-localize its position and orientation relative to the model and without drifting from sensor data. In some embodiments, motion sensors can be used to seed the frame to frame transformation and therefore bring correspondences between the rendered virtual or augmented reality scenery closer to the sensed control object, making the result less ambiguous (i.e., the system would have an easier time determining what motion of the head had occurred to result in the change in view from that of the model). In a yet further embodiment, sensor data could be used to filter the solution above so that the motions appear to be smoother from frame to frame, while still remaining impervious to drift caused by relying upon motion sensors alone.

Virtual/Augmented Reality

Sensory processing system 106 includes a number of components for generating an immersive purely virtual and/or augmented environment. The first component is a camera such as cameras 102 or 104 or other video input to generate a digitized video image of the real world or user-interaction region. The camera can be any digital device that is dimensioned and configured to capture still or motion pictures of the real world and to convert those images to a digital stream of information that can be manipulated by a computer. For example, cameras 102 or 104 can be digital still cameras, digital video cameras, web cams, head-mounted displays, phone cameras, tablet personal computers, ultra-mobile personal computers, and the like.

The second component is a transparent, partially transparent, or semi-transparent user interface such as display 120 (embedded in a user computing device like a wearable goggle or a smartphone) that combines rendered 3D virtual imagery with a view of the real world, so that both are visible at the same time to a user. In some implementations, the rendered 3D virtual imagery can projected using holographic, laser, stereoscopic, autostereoscopic, or volumetric 3D displays.

In one implementation, a virtual reality and/or augmented reality (AR) environment can be created by instantiation of a free-floating virtual modality in a real world physical space. In one implementation, computer-generated imagery, presented as free-floating virtual modality, can be rendered in front of a user as reflections using real-time rendering techniques such as orthographic or perspective projection, clipping, screen mapping, rasterizing and transformed into the field of view or current view space of a live camera embedded in a video projector, holographic projection system, smartphone, wearable goggle or other head mounted display (HMD), or heads up display (HUD). In some other implementations, transforming models into the current view space can be accomplished using sensor output from onboard sensors. For example, gyroscopes, magnetometers and other motion sensors can provide angular displacements, angular rates and magnetic readings with respect to a reference coordinate frame, and that data can be used by a real-time onboard rendering engine to generate 3D imagery. If the user physically moves a user computing device, resulting in a change of view of the embedded camera, the virtual modality and computer-generated imagery can be updated accordingly using the sensor data.

In some implementations, a virtual modality can include a variety of information from a variety of local or network information sources. Some examples of information include specifications, directions, recipes, data sheets, images, video clips, audio files, schemas, user interface elements, thumbnails, text, references or links, telephone numbers, blog or journal entries, notes, part numbers, dictionary definitions, catalog data, serial numbers, order forms, marketing or advertising and any other information that may be useful to a user. Some examples of information resources include local databases or cache memory, network databases, Websites, online technical libraries, other devices, or any other information resource that can be accessed by user computing devices either locally or remotely through a communication link.

Virtual items in a presentation output, rendered across an interface of a wearable sensor system, can include text, images, or references to other information (e.g., links). In one implementation, interactive virtual items can be displayed proximate to their corresponding real-world objects. In another implementation, interactive virtual items can describe or otherwise provide useful information about the objects to a user.

Projected AR allows users to simultaneously view the real word physical space and the interactive virtual items superimposed in the space. In one implementation, these interactive virtual items can be projected on to the real word physical space using micro-projectors embedded in wearable goggle or other head mounted display (HMD) that cast a perspective view of a stereoscopic 3D imagery onto the real world space. In such an implementation, a camera, in-between the micro-projectors can scan for infrared identification markers placed in the real world space. The camera can use these markers to precisely track the user's head position and orientation in the real word physical space, according to another implementation. Yet another implementation includes using retroreflectors in the real word physical space to prevent scattering of light emitted by the micro-projectors and to provision multi-user participation by maintaining distinct and private user views. In such an implementation, multiple users can simultaneously interact with the same virtual modality, such that they both view the same virtual objects and manipulations to virtual objects by one user are seen by the other user.

In other implementations, projected AR obviates the need of using wearable hardware such as goggles and other hardware like displays to create an AR experience. In such implementations, a video projector, volumetric display device, holographic projector, and/or heads-up display can be used to create a "glasses-free" AR environment. In one implementation, such projectors can be electronically coupled to user computing devices such as smartphones or laptop and configured to produce and magnify virtual items that are perceived as being overlaid on the real word physical space.

The third component is the sensory processing system 106, which captures a series of sequentially temporal images of a region of interest. It further identifies any gestures performed in the region of interest and controls responsiveness of the rendered 3D virtual imagery to the performed gestures by updating the 3D virtual imagery based on the corresponding gestures.

Feature Matching

Motion information of a wearable sensor system or a user or body portion of the user can be determined with respect to a feature of a the real world space that includes the wearable sensory system and/or the user. Some implementations include the features of a real world space being different real world products or objects in the real world space such as furniture (chairs, couches, tables, etc.), kitchen appliances (stoves, refrigerators, dishwashers, etc.), office appliances (copy machines, fax machines, computers), consumer and business electronic devices (telephones, scanners, etc.), furnishings (pictures, wall hangings, sculpture, knick knacks, plants), fixtures (chandeliers and the like), cabinetry, shelving, floor coverings (tile, wood, carpets, rugs), wall coverings, paint colors, surface textures, countertops (laminate, granite, synthetic countertops), electrical and telecommunication jacks, audio-visual equipment, speakers, hardware (hinges, locks, door pulls, door knobs, etc.), exterior siding, decking, windows, shutters, shingles, banisters, newels, hand rails, stair steps, landscaping plants (trees, shrubs, etc.), and the like, and qualities of all of these (e.g. color, texture, finish, etc.).

As discussed above, a combination of RGB and IR pixels can be used to respectively capture the gross and fine features of the real world space. Once captured, changes in features values are detected by comparing pairs of frames of the captured video stream. In one implementation, subpixel refinement of the matches is used to determine the position of the wearable sensory system with respect to the analyzed feature. In another implementation, a feature in one image is matched to every feature within a fixed distance from it in the successive image such that all features that are within a certain disparity limit from each other. In other implementations, normalized correlation over a specified window can be used to evaluate the potential matches.

Some other implementations include copying each identified feature from a frame and storing the feature as a vector. Further, a scalar product of the identified feature vectors is calculated and a mutual consistency check is applied such that a feature with highest normalized correlation is considered to be determinative and changes in the feature values (position, orientation) of the feature are used to calculate motion information of the wearable sensory system. In other implementations, sum of absolute differences (SAD) can be used to identify the determinative feature in a real world space.

Figure 6:
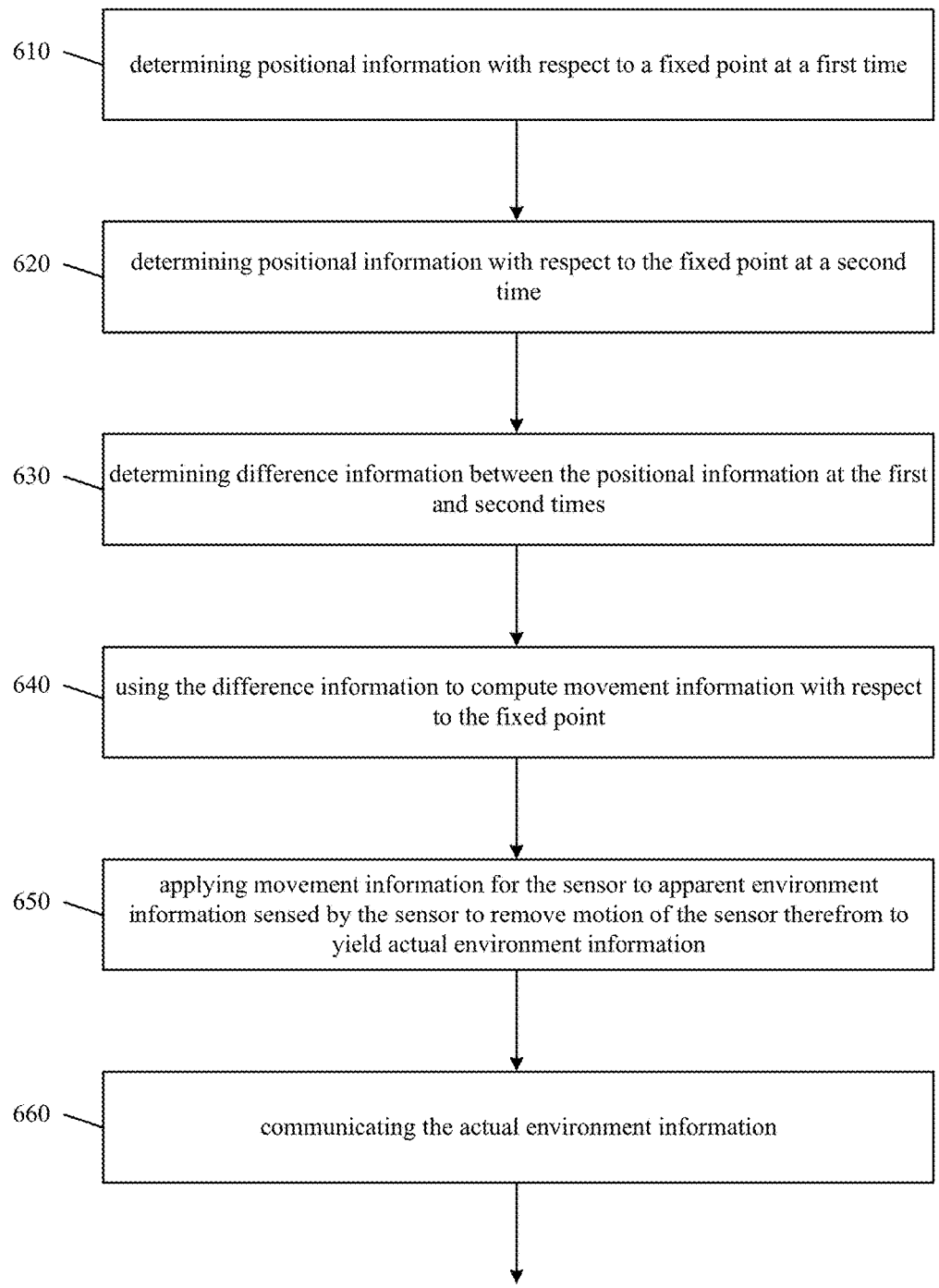
FIG. 6 shows a flowchart of one implementation of determining motion information in a movable sensor apparatus.

FIG. 6 shows a flowchart 600 of one implementation of determining motion information in a movable sensor apparatus. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 610, a first positional information of a portable or movable sensor is determined with respect to a fixed point at a first time. In one implementation, first positional information with respect to a fixed point at a first time $t=t_0$ is determined from one or motion sensors integrated with, or coupled to, a device including the portable or movable sensor. For example, an accelerometer can be affixed to device 101 of FIG. 1 or sensor 300 of FIG. 3, to provide acceleration information over time for the portable or movable device or sensor. Acceleration as a function of time can be integrated with respect to time (e.g., by sensory processing system 106) to provide velocity information over time, which can be integrated again to provide positional information with respect to time. In another example, gyroscopes, magnetometers or the like can provide information at various times from which positional information can be derived. These items are well known in the art and their function can be readily implemented by those possessing ordinary skill. In another implementation, a second motion-capture sensor (e.g., such as sensor 300 of FIG. 3 for example) is disposed to capture position information of the first sensor (e.g., affixed to 101 of FIG. 1 or sensor 300 of FIG. 3) to provide positional information for the first sensor.

At action 620, a second positional information of the sensor is determined with respect to the fixed point at a second time $t=t_1$.

At action 630, difference information between the first positional information and the second positional information is determined.

At action 640, movement information for the sensor with respect to the fixed point is computed based upon the difference information. Movement information for the sensor with respect to the fixed point is can be determined using techniques such as discussed above with reference to equations (2).

At action 650, movement information for the sensor is applied to apparent environment information sensed by the sensor to remove motion of the sensor therefrom to yield actual environment information. Motion of the sensor can be removed using techniques such as discussed above with reference to FIGS. 4-5.

At action 660, actual environment information is communicated.

Figure 7:
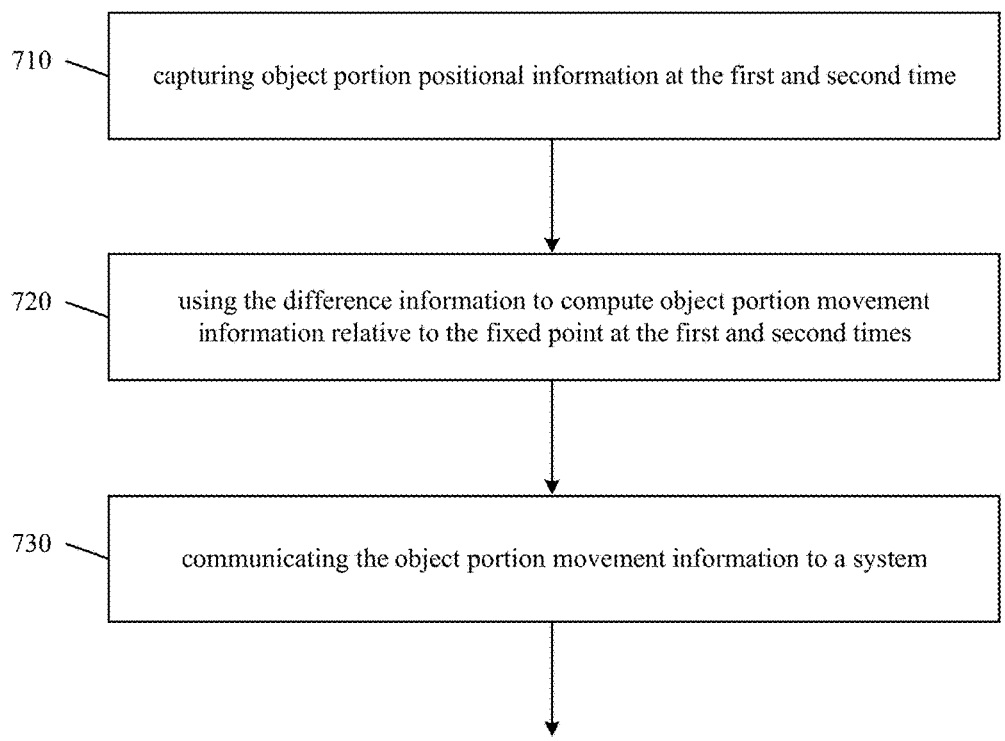
FIG. 7 shows a flowchart of one implementation of applying movement information to apparent environment information sensed by the sensor to yield actual environment information in a movable sensor apparatus.

FIG. 7 shows a flowchart 700 of one implementation of applying movement information for the sensor to apparent environment information (e.g., apparent motions of objects in the region of interest 112 as sensed by the sensor) to remove motion of the sensor therefrom to yield actual environment information (e.g., actual motions of objects in the region of interest 112 relative to the reference frame 120a). Flowchart 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 710, positional information of an object portion at the first time and the second time are captured.

At action 720, object portion movement information relative to the fixed point at the first time and the second time is computed based upon the difference information and the movement information for the sensor.

At action 730, object portion movement information is communicated to a system.

Some implementations will be applied to virtual reality or augmented reality applications. For example, and with reference to FIG. 8, which illustrates a system 800 for projecting a virtual device augmented reality experience 801 including one or more real objects, e.g., a desk surface medium 116 according to one implementation of the technology disclosed. System 800 includes a sensory processing system 106 controlling a variety of sensors and projectors, such as for example one or more cameras 102, 104 (or other image sensors) and optionally some illumination sources 115, 117 comprising an imaging system. Optionally, a plurality of vibrational (or acoustical) sensors 808, 810 positioned for sensing contacts with desk 116 can be included. Optionally projectors under control of system 106 can augment the virtual device experience 801, such as an optional audio projector 802 to provide for example audio feedback, optional video projector 804, an optional haptic projector 806 to provide for example haptic feedback to a user of virtual device experience 801. For further information on projectors, reference may be had to "Visio-Tactile Projector" YouTube <https://www.youtube.com/watch?v=Bb0hNMxxewg> (accessed Jan. 15, 2014). In operation, sensors and projectors are oriented toward a region of interest 112, that can include at least a portion of a desk 116, or free space 112 in which an object of interest 114 (in this example, a hand) moves along the indicated path 118. One or more applications 821 and 822 can be provided as virtual objects integrated into the display of the augmented reality 113. Accordingly, user (e.g., owner of hand 114) is able to interact with real objects e.g., desk 816, cola 817, in the same environment as virtual objects 801.

Figure 9:
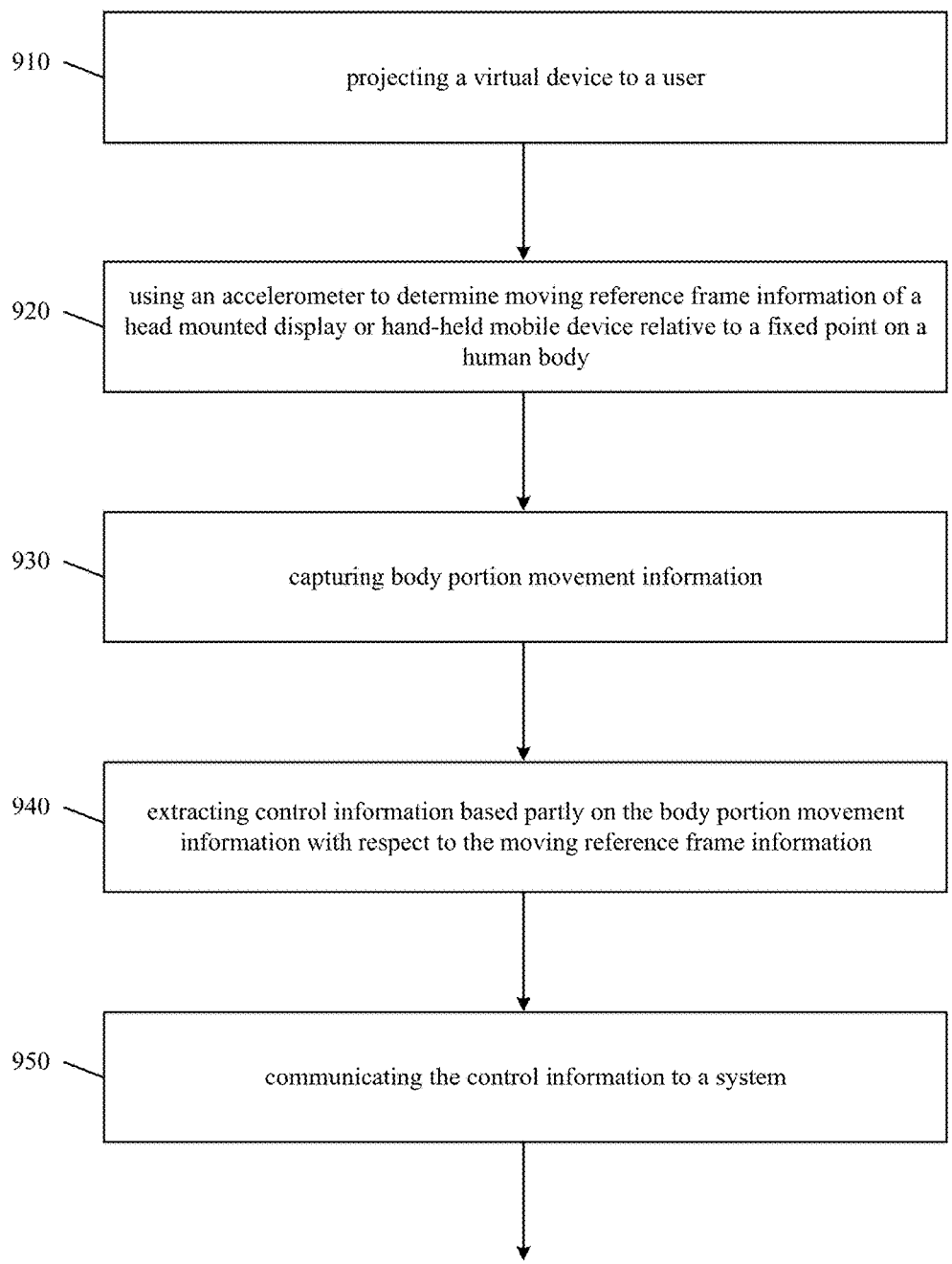
FIG. 9 shows a flowchart of one implementation of providing a virtual device experience.

FIG. 9 shows a flowchart 900 of one implementation of providing a virtual device experience. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

At action 910, a virtual device is projected to a user. Projection can include an image or other visual representation of an object. For example, visual projection mechanism 120 of FIG. 8 can project a page (e.g., virtual device 801) from a book into a virtual environment 801 (e.g., surface portion 116 or in space 112) of a reader; thereby creating a virtual device experience of reading an actual book, or an electronic book on a physical e-reader, even though no book nor e-reader is present. In some implementations, optional haptic projector 806 can project the feeling of the texture of the "virtual paper" of the book to the reader's finger. In some implementations, optional audio projector 802 can project the sound of a page turning in response to detecting the reader making a swipe to turn the page.

At action 920, using an accelerometer, moving reference frame information of a head mounted device (or hand-held mobile device) relative to a fixed point on a human body is determined.

At action 930, body portion movement information is captured. Motion of the body portion can be detected via sensors 108, 110 using techniques such as discussed above with reference to FIG. 6.

At action 940, control information is extracted based partly on the body portion movement information with respect to the moving reference frame information. For example, repeatedly determining movement information for the sensor and the object portion at successive times and analyzing a sequence of movement information can be used to determine a path of the object portion with respect to the fixed point. For example, a 3D model of the object portion can be constructed from image sensor output and used to track movement of the object over a region of space. The path can be compared to a plurality of path templates and identifying a template that best matches the path. The template that best matches the path control information to a system can be used to provide the control information to the system. For example, paths recognized from an image sequence (or audio signal, or both) can indicate a trajectory of the object portion such as a gesture of a body portion.

At action 950, control information can be communicated to a system. For example, a control information such as a command to turn the page of a virtual book can be sent based upon detecting a swipe along the desk surface of the reader's finger. Many other physical or electronic objects, impressions, feelings, sensations and so forth can be projected onto surface 116 (or in proximity thereto) to augment the virtual device experience and applications are limited only by the imagination of the user.

Figure 10:
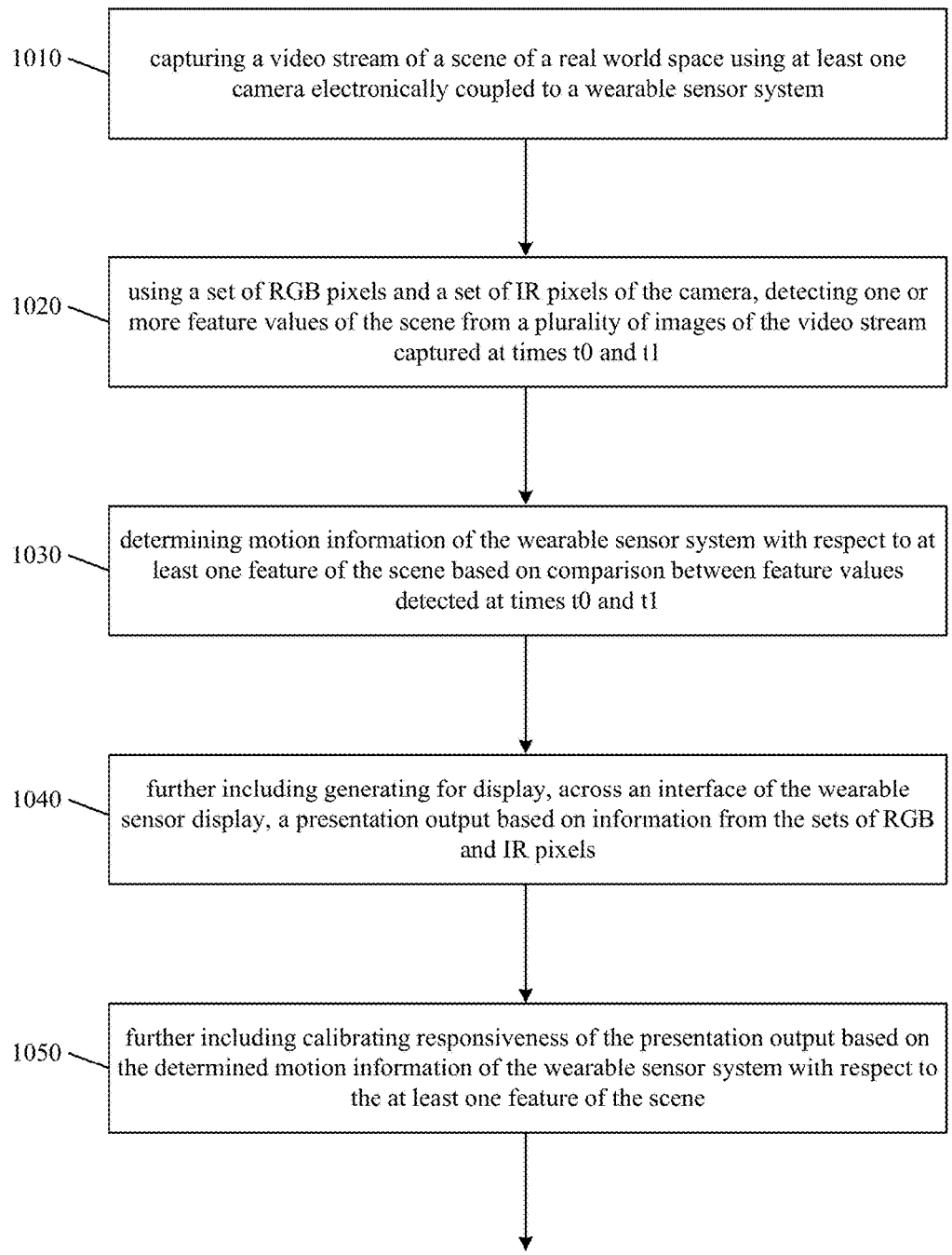
FIG. 10 is a flowchart showing a method of tracking motion of a wearable sensor system.

FIG. 10 is a flowchart showing a method 1000 of tracking motion of a wearable sensor system. Flowchart 1000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

At action 1010, a video stream of a scene of a real world space is captured using at least one camera electronically coupled to a wearable sensor system.

At action 1020, one or more feature values of the scene are detected from a plurality of images of the video stream captured at times t0 and t1 using a set of RGB pixels and a set of IR pixels of the camera. In one implementation, the wearable sensor system has moved between t0 and t1.

At action 1030, motion information of the wearable sensor system is determined with respect to at least one feature of the scene based on comparison between feature values detected at times t0 and t1.

At action 1040, a presentation output is generated for display across an interface of the wearable sensor display based on information from the sets of RGB and IR pixels.

At action 1050, responsiveness of the presentation output is automatically calibrated based on the determined motion information of the wearable sensor system with respect to the at least one feature of the scene. In one implementation, perceived field of view of the presentation output is proportionally adjusting responsive to the determined motion information of the wearable sensor system with respect to the at least one feature of the scene.

In yet another implementation, motion information of a body portion engaged with the wearable sensory system is determined based on the motion information of the wearable sensor system.

In some implementations, gross features of the real world space are extracted using RGB pixels that respectively capture red, green, and blue components of illumination in the scene.

In other implementations, fine features of the real world space are extracted using IR pixels that capture infrared components of illumination in the scene. In one implementation, fine features of the real world space include surface texture of the real world space. In another implementation, fine features of the real world space include edges of the real world space. In some another implementation, fine features of the real world space include curvatures of the real world space. In yet another implementation, fine features of the real world space include surface texture of objects in the real world space. In a further implementation, fine features of the real world space include edges of objects in the real world space.

In some implementations, fine features of the real world space include curvatures of objects in the real world space. In another implementation, a feature of the scene is an object in the real world space. In some other implementation, a feature value of the scene is orientation of the object. In yet another implementation, a feature value of the scene is position of the object. In a further implementation, a feature of the scene is an arrangement of plurality of objects in the real world space. In other implementations, a feature value of the scene is position of the objects with respect to each other in the arrangement.

According to some implementations, comparison between feature values includes detecting a change in rotation between the images captured at times t0 and t1. According to other implementations, comparison between feature values includes detecting a change in translation between the images captured at times t0 and t1.

In yet other implementations, motion information of the wearable sensor system is determined with respect to at least one feature of the scene by matching features in images captured at time t0 with corresponding features in images captured at time t1. In one implementation, the matched features are within a threshold distance.

In another implementation, motion information of the wearable sensor system is determined with respect to at least one feature of the scene by calculating displacement between the images captured at times t0 and t1 based on at least one of RGB and IR pixel values.

In one implementation, the motion information includes position of the wearable sensor system. In another implementation, the motion information includes orientation of the wearable sensor system. In yet another implementation, the motion information includes velocity of the wearable sensor system. In a further implementation, the motion information includes acceleration of the wearable sensor system.

Some implementations include using monocular vision to capture the video stream. Other implementations include using stereoscopic vision to capture the video stream. Yet other implementations including more than two cameras to capture the video stream.

In one implementation, the images captured at times t0 and t1 are successive image pairs. In another implementation, the images captured at times t0 and t1 are alternative image pairs. In a further implementation, the images captured at times t0 and t1 are alternative image pairs. In yet another implementation, the images captured are right and left stereo images captured simultaneously.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 11:
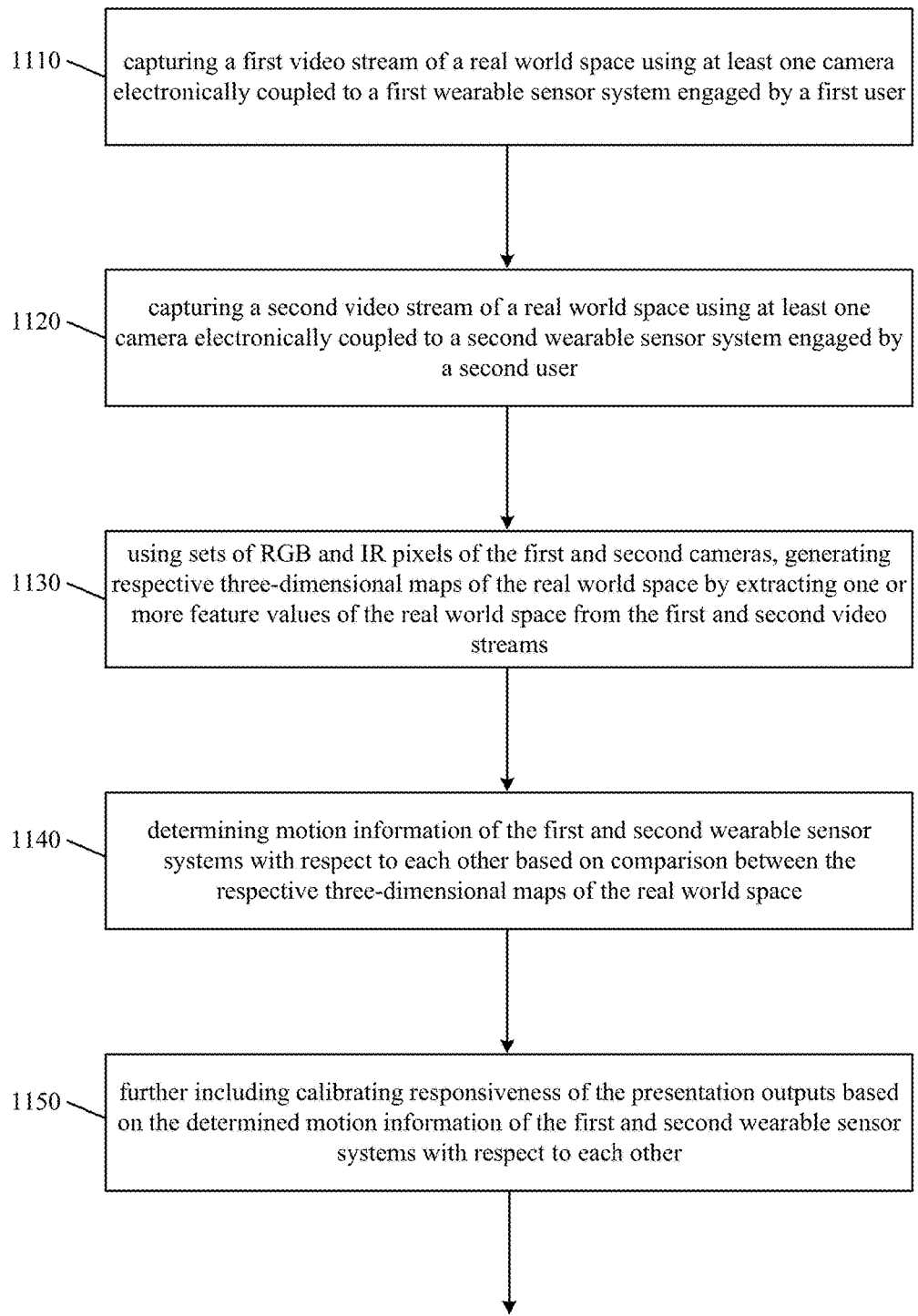
FIG. 11 shows a flowchart of one implementation of creating a multi-user interactive virtual environment using wearable sensor systems.

FIG. 11 shows a flowchart 1100 of one implementation of creating a multi-user interactive virtual environment using wearable sensor systems. Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

At action 1110, a first video stream of a real world space is captured using at least one camera electronically coupled to a first wearable sensor system engaged by a first user.

At action 1120, a second video stream of a real world space is captured using at least one camera electronically coupled to a second wearable sensor system engaged by a second user.

At action 1130, respective three-dimensional maps of the real world space are generated using sets of RGB and IR pixels of the first and second cameras by extracting one or more feature values of the real world space from the first and second video streams. In one implementation, generating respective three-dimensional maps further includes determining a graph of features of the real world space based on the extracted feature values.

At action 1140, motion information of the first and second wearable sensor systems is determined with respect to each other based on comparison between the respective three-dimensional maps of the real world space.

At action 1150, responsiveness of the presentation outputs is automatically calibrated based on the determined motion information of the first and second wearable sensor systems with respect to each other. In some implementations, presentation outputs are generated for display across respective interfaces of the first and second wearable sensor systems based on information from the sets of RGB and IR pixels of the first and second cameras. In other implementations, respective perceived fields of view of the presentation outputs are proportionally adjusted responsive to the determined motion information of the first and second wearable sensor systems with respect to each other.

Some other implementations include determining motion information of respective body portions of the first and second users based on the motion information of the first and second wearable sensor systems with respect to each other.

In some implementations, gross features of the real world space are extracted using RGB pixels that respectively capture red, green, and blue components of illumination in the scene.

In other implementations, fine features of the real world space are extracted using IR pixels that capture infrared components of illumination in the scene. In one implementation, fine features of the real world space include surface texture of the real world space. In another implementation, fine features of the real world space include edges of the real world space. In some another implementation, fine features of the real world space include curvatures of the real world space. In yet another implementation, fine features of the real world space include surface texture of objects in the real world space. In a further implementation, fine features of the real world space include edges of objects in the real world space.

In some implementations, fine features of the real world space include curvatures of objects in the real world space. In another implementation, a feature of the scene is an object in the real world space. In some other implementation, a feature value of the scene is orientation of the object. In yet another implementation, a feature value of the scene is position of the object. In a further implementation, a feature of the scene is an arrangement of plurality of objects in the real world space. In other implementations, a feature value of the scene is position of the objects with respect to each other in the arrangement.

According to some implementations, comparison between feature values includes detecting a change in rotation between the images captured at times t0 and t1. According to other implementations, comparison between feature values includes detecting a change in translation between the images captured at times t0 and t1.

In yet other implementations, motion information of the wearable sensor system is determined with respect to at least one feature of the scene by matching features in images captured at time t0 with corresponding features in images captured at time t1. In one implementation, the matched features are within a threshold distance.

In another implementation, motion information of the wearable sensor system is determined with respect to at least one feature of the scene by calculating displacement between the images captured at times t0 and t1 based on at least one of RGB and IR pixel values.

In one implementation, the motion information includes position of the wearable sensor system. In another implementation, the motion information includes orientation of the wearable sensor system. In yet another implementation, the motion information includes velocity of the wearable sensor system. In a further implementation, the motion information includes acceleration of the wearable sensor system.

Some implementations include using monocular vision to capture the video stream. Other implementations include using stereoscopic vision to capture the video stream. Yet other implementations including more than two cameras to capture the video stream.

In one implementation, the images captured at times t0 and t1 are successive image pairs. In another implementation, the images captured at times t0 and t1 are alternative image pairs. In a further implementation, the images captured at times t0 and t1 are alternative image pairs. In yet another implementation, the images captured are right and left stereo images captured simultaneously.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 12:
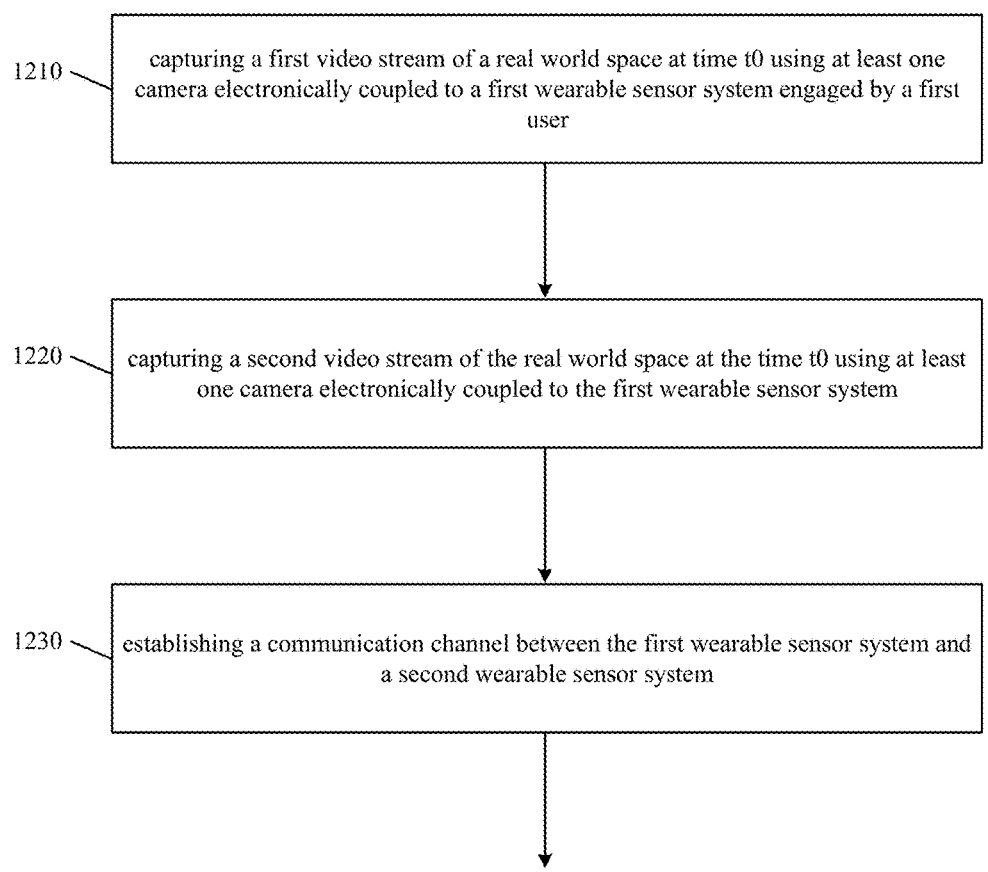
FIG. 12 shows a flowchart of sharing content between wearable sensor systems.

FIG. 12 shows a flowchart 1200 of sharing content between wearable sensor systems. Flowchart 1200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

At action 1210, a first video stream of a real world space is captured at time t0 using at least one camera electronically coupled to a first wearable sensor system engaged by a first user. In one implementation, the first video stream is captured at a field of view of the first user.

At action 1220, a second video stream of the real world space is captured at the time t0 using at least one camera electronically coupled to the first wearable sensor system. In one implementation, the second video stream is captured at a field of view of the camera.

At action 1230, a communication channel is established between the first wearable sensor system and a second wearable sensor system and the second video stream is transmitted to the second wearable sensor system.

This method and other implementations of the technology disclosed can include one or more of the following features and/or features described in connection with additional methods disclosed. In the interest of conciseness, the combinations of features disclosed in this application are not individually enumerated and are not repeated with each base set of features.

In some implementations, the second video stream is preprocessed to enhance resolution and sending the preprocessed second video stream via the communication channel to the second wearable sensor system.

In other implementations, the second video stream is preprocessed to reduce bandwidth and sending the preprocessed second video stream via the communication channel to the second wearable sensor system.

In one implementation, the field of view of the at least one camera substantially overlaps with the field of view of the user. In another implementation, the field of view of the at least one camera encompasses and exceeds the field of view of the user. In yet another implementation, the field of view of the at least one camera narrows and deceeds the field of view of the user. In some other implementation, the field of view of the at least one camera is separate and additional to the field of view of the user.

In one implementation, short-beam illumination elements are used to capture a narrow-field of view. In some implementations, the short-beam illumination elements have a beam angle of approximately 60°. In another implementation, wide-beam illumination elements are used to capture a broad-field of view. In some implementations, the wide-beam illumination elements have a beam angle of approximately 120°.

In some implementations, the second video stream is transmitted to the second sensor system in response to user selection.

Typically, a "wide beam" is about 120° wide and a narrow beam is approximately 60° wide, although these are representative figures only and can vary with the application; more generally, a wide beam can have a beam angle anywhere from >90° to 180°, and a narrow beam can have a beam angle anywhere from >0° to 90°. For example, the detection space can initially be lit with one or more wide-beam lighting elements with a collective field of view similar to that of the tracking device, e.g., a camera. Once the object's position is obtained, the wide-beam lighting element(s) can be turned off and one or more narrow-beam lighting elements, pointing in the direction of the object, activated. As the object moves, different ones of the narrow-beam lighting elements are activated. In many implementations, these directional lighting elements only need to be located in the center of the field of view of the camera; for example, in the case of hand tracking, people will not often try to interact with the camera from a wide angle and a large distance simultaneously.

If the tracked object is at a large angle to the camera (i.e., far to the side of the motion-tracking device), it is likely relatively close to the device. Accordingly, a low-power, wide-beam lighting element can be suitable in some implementations. As a result, the lighting array can include only one or a small number of wide-beam lighting elements close to the camera along with an equal or larger number of narrow-beam devices (e.g., collectively covering the center-field region of space in front of the camera—for example, within a 30° or 45° cone around the normal to the camera). Thus, it is possible to decrease or minimize the number of lighting elements required to illuminate a space in which motion is detected by using a small number of wide-beam elements and a larger (or equal) number of narrow-beam elements directed toward the center field.

It is also possible to cover a wide field of view with many narrow-beam LEDs pointing in different directions, according to other implementations. These can be operated so as to scan the monitored space in order to identify the elements actually spotlighting the object; only these are kept on and the others turned off In some embodiments, the motion system computes a predicted trajectory of the tracked object, and this trajectory is used to anticipate which illumination elements should be activated as the object moves. The trajectory is revised, along with the illumination pattern, as new tracking information is obtained.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 13:
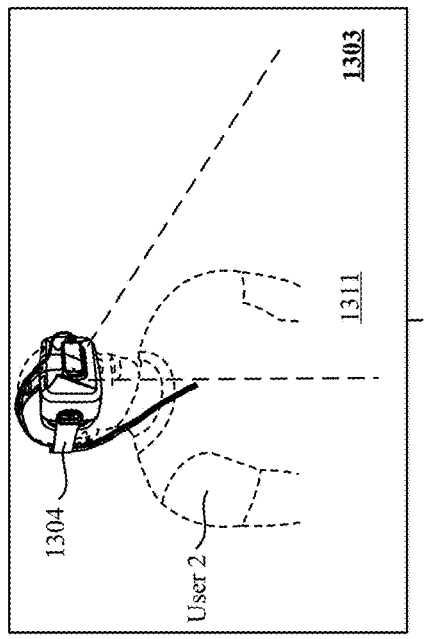
FIGS. 13 and 14 illustrate one implementation of creating a multi-user interactive virtual environment using wearable sensory systems like HMDs.
Figure 13:
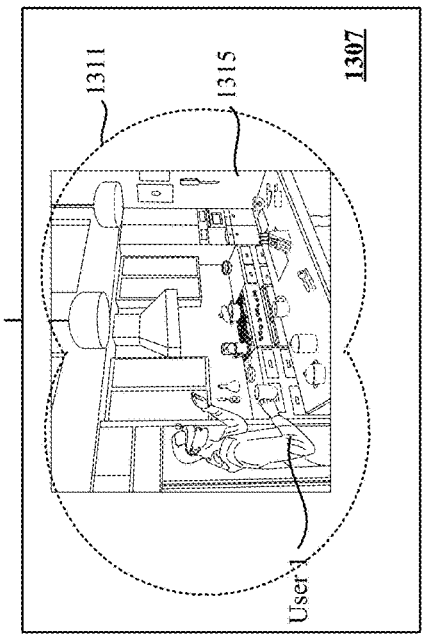
Figure 13:
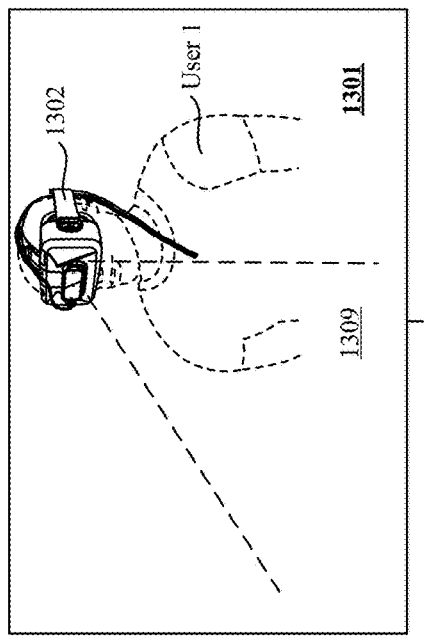
Figure 13:
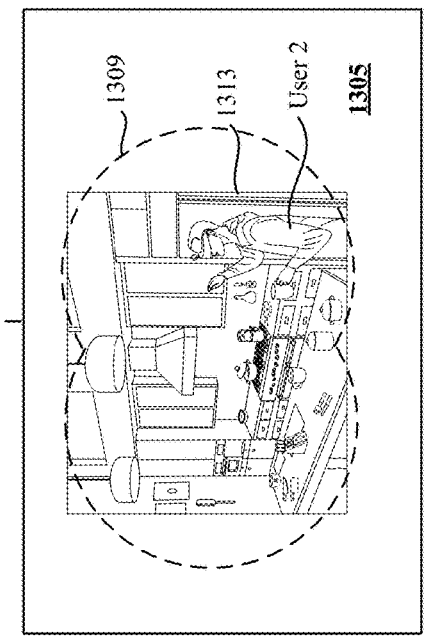
Figure 14:
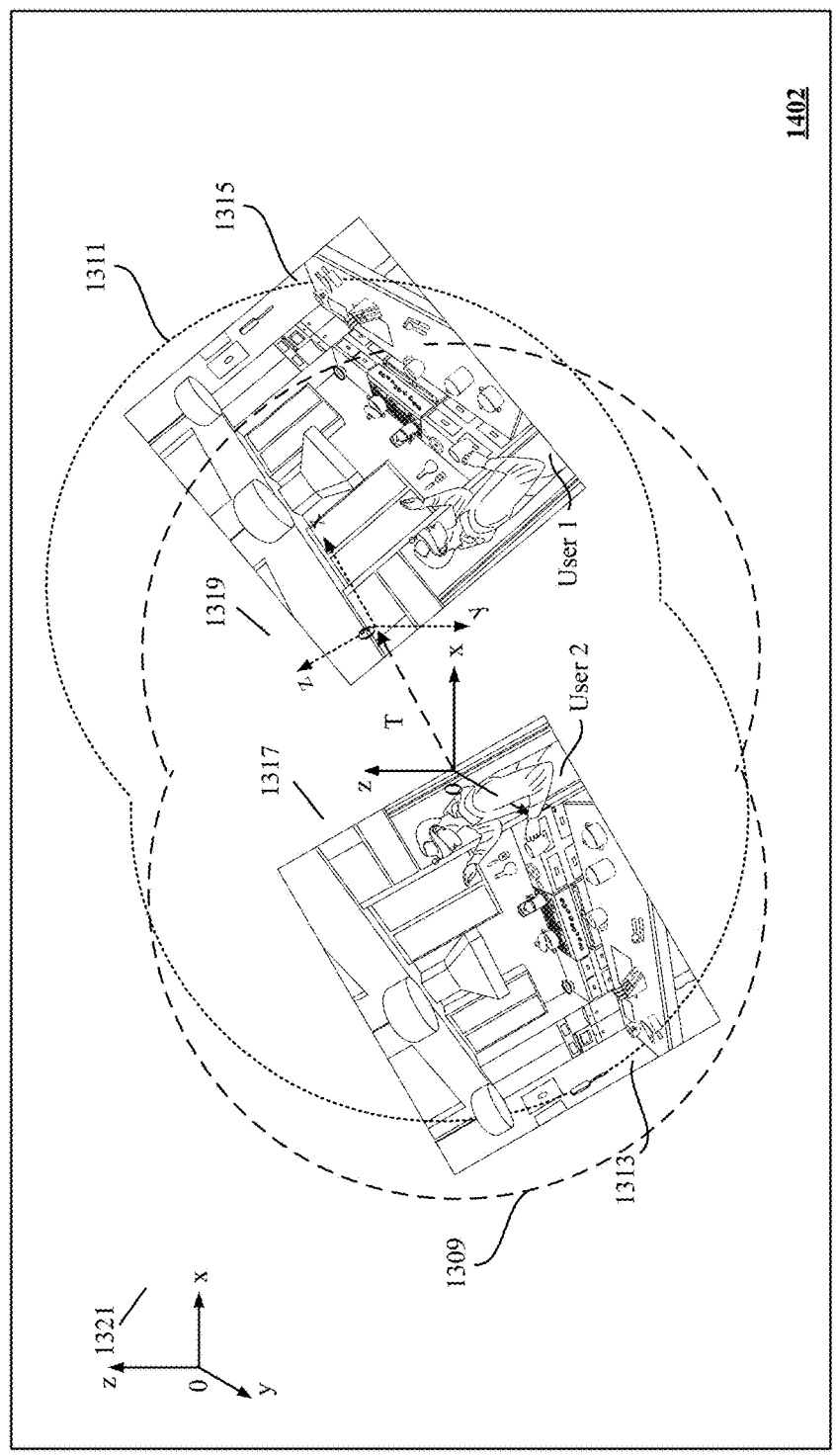

FIGS. 13-14 illustrate one implementation of creating a multi-user interactive virtual environment 1300 using wearable sensory systems like HMDs 1302 and 1304. In particular, block 1301 shows that a first video stream of a real world space (e.g. a kitchen with users 1 and 2) is captured using a first camera of HMD 1302 worn by user 1. Similarly, block 1303 depicts that a second video stream of the same real world space is captured using a second camera of the HMD 1304 worn by user 2. The respective fields of view 1309 and 1311 of the two HMDs 1302 and 1304 are opposite to each other i.e. 180° apart because users 1 and 2 are facing each other. As a result, map 1313 for user 1 includes user 2 and vice-versa. In other implementations, fields of view 1309 and 1311 can be any angle(s) apart from each other, such that they can overlap each other or be divergent from each other to certain degree(s) or entirely.

Further, respective three-dimensional maps 1313 (block 1305) and 1315 (block 1307) are generated using RGB and IR pixels of the first and second cameras employing stereoscopic vision technology. In one implementation, the three-dimensional maps 1313 and 1315 are generated using particular features of the real world space (e.g. a kettle in the kitchen). In other implementations, the three-dimensional maps 1313 and 1315 are generated using time of flight (TOF) information from the first and second cameras serving as TOF cameras. In yet other implementations, the three-dimensional maps 1313 and 1315 are generated using beam-formed signals, as described in "DETERMINING POSITIONAL INFORMATION FOR AN OBJECT IN SPACE", U.S. Non-Prov. application Ser. No. 14/523,828, filed on 24 Oct. 2014, which is incorporated by reference in this application. In further implementations, the three-dimensional maps 1313 and 1315 are generated using reflected light, as described in "DETERMINING POSITIONAL INFORMATION FOR AN OBJECT IN SPACE", U.S. Non-Prov. application Ser. No. 14/214,605, filed on 14 Mar. 2014, which is incorporated by reference in this application.

Advancing further, the three-dimensional maps 1313 and 1315 are compared by comparing prominent features (e.g. lamps or chimney in the kitchen) of the real world space in the respective maps 1313 and 1315 and identifying differences in the prominent features. Further, differences in the prominent features are used to determine positional differences between HMDs 1302 and 1304 using triangulation techniques disclosed in U.S. Non-Prov. application Ser. No. 14/523,828.

In another implementation, position information of HMDs 1302 and 1304 is determined by detecting the HMDs in each other's fields of view 1309 and 1311 (e.g. detecting LEDs of the HMDs) and then applying the triangulation techniques disclosed in U.S. Non-Prov. application Ser. No. 14/523,828 to determine relative positions of the HMDs with respect to each other. The relative positions of the HMDs with respect to each other provide the corresponding fields of view 1309 and 1311. Further, image information of the three-dimensional maps 1313 and 1315 is determined from the fields of view 1309 and 1311. Then, image information for the first map 1313 is aligned with the image information of the second map 1315 to identify similar prominent features in the maps. In other implementations, image information from the two maps is combined to create a larger, more comprehensive and inclusive three-dimensional map of the real world space.

FIG. 14 depicts one implementation of comparing 1400 three-dimensional maps 1313 and 1315 to determine motion information of HMDs 1302 and 1304. The position and orientation of three-dimensional map 1313 is known with respect to device reference frame 1317 of HMD 1302. The position and orientation of HMD 1302's device reference frame 1319 and three-dimensional map 1315 are respectively different from that of device reference frame 1317 and three-dimensional map 1313. The difference in position and orientation of device reference frames 1317 and 1319 is indicated by transformation T. Implementations can provide sensing the position and rotation of reference frame 1319 with respect to reference frame 1317 and sensing the position and rotation of tracked common features (e.g. kettle, chimney, lamps, or counter in the kitchen) in maps 1313 and 1315 with respect to 1319. Implementations can determine the position and rotation of tracked common features with respect to 1317 from the sensed position and rotation of reference frame 1319 with respect to reference frame 1317 and the sensed position and rotation of tracked common features with respect to 1319.

In an implementation shown in block 1402, a transformation R is determined that moves dashed line reference frame 1317 to dotted line reference frame 1319, without intermediate conversion to an absolute or world frame of reference. Applying the reverse transformation $R^T$ makes the dotted line reference frame 1319 lie on top of dashed line reference frame 1317. Then the three-dimensional maps 1313 and 1315 can overlap from the point of view of dashed line reference frame 1317. (It is noteworthy that $R^T$ is equivalent to $R^{-1}$ for our purposes.) In determining the motion of tracked common features, sensory processing system 106 can determine their location and direction by computationally analyzing the three-dimensional maps 1313 and 1315 and using motion information captured by sensors 108, 110. For example, position of any point on the three-dimensional map 1313 at time $$t = t_0: \begin{bmatrix} x \\ y \\ z \\ 1 \end{bmatrix},$$

can be converted to a position of the point on the three-dimensional map 1315 at time $$t = t_1: \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}$$

from the frame of reference of the device. We refer to the combination of a rotation and translation, which are not generally commutative, as the affine transformation.

$$\begin{bmatrix} R_{ref}^T & -R_{ref}^T * T_{ref} \\ 0 & 1 \end{bmatrix}$$

as provided for in equation (1):

$$\begin{bmatrix} R_{ref}^T & (-R_{ref}^T) * T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (1)$$

Where:

$R_{ref}^T$—Represents the rotation matrix part of an affine transform describing the rotation transformation from the device reference frame 1317 to the device reference frame 1319.

$T_{ref}$—Represents translation of the device reference frame 1317 to the device reference frame 1319.

One conventional approach to obtaining the Affine transform R (from axis unit vector $u=(u_x, u_y, u_z)$, rotation angle θ) method. Wikipedia, at <http://en.wikipedia.org/wiki/Rotation_matrix>, Rotation matrix from axis and angle, on Jan. 30, 2014, 20:12 UTC, upon which the computations equation (2) are at least in part inspired:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix} \quad (2)$$

$$R^T = \begin{bmatrix} \cos\theta + u_x^2(1-\cos\theta) & u_y u_x(1-\cos\theta) + u_z\sin\theta & u_z u_x(1-\cos\theta) - u_y\sin\theta \\ u_x u_y(1-\cos\theta) - u_z\sin\theta & \cos\theta + u_y^2(1-\cos\theta) & u_z u_y(1-\cos\theta) + u_x\sin\theta \\ u_x u_z(1-\cos\theta) + u_y\sin\theta & u_y u_z(1-\cos\theta) - u_x\sin\theta & \cos\theta + u_z^2(1-\cos\theta) \end{bmatrix}$$

$$-R^T = \begin{bmatrix} -\cos\theta - u_x^2(1-\cos\theta) & -u_y u_x(1-\cos\theta) - u_z\sin\theta & -u_z u_x(1-\cos\theta) + u_y\sin\theta \\ -u_x u_y(1-\cos\theta) + u_z\sin\theta & -\cos\theta - u_y^2(1-\cos\theta) & -u_z u_y(1-\cos\theta) - u_x\sin\theta \\ -u_x u_z(1-\cos\theta) - u_y\sin\theta & -u_y u_z(1-\cos\theta) + u_x\sin\theta & -\cos\theta - u_z^2(1-\cos\theta) \end{bmatrix}$$

$$T = \begin{bmatrix} a \\ b \\ c \end{bmatrix}$$

is a vector representing a translation of the object with respect to origin of the coordinate system of the translated frame, $$-R^T * T = \begin{bmatrix} (-\cos\theta - u_x^2(1-\cos\theta))(a) + (-\cos\theta - u_y^2(1-\cos\theta))(b) + (-u_z u_x(1-\cos\theta) + u_y\sin\theta)(c) \\ (-u_x u_y(1-\cos\theta) + u_z\sin\theta)(a) + (-\cos\theta - u_y^2(1-\cos\theta))(b) + (-u_z u_y(1-\cos\theta) - u_x\sin\theta)(c) \\ (-u_x u_z(1-\cos\theta) - u_y\sin\theta)(a) + (-u_y u_z(1-\cos\theta) + u_x\sin\theta)(b) + (-\cos\theta - u_z^2(1-\cos\theta))(c) \end{bmatrix}$$

The correct location at time $t=t_1$ of a point on the tracked common features with respect to device reference frame 1317 is given by an inverse affine transformation, e.g., In another example, an orientation and position of the common features in three-dimensional map 1313 at time $t=t_0$: vector pair $$\begin{bmatrix} R_{obj} & T_{obj} \\ 0 & 1 \end{bmatrix},$$

can be converted to a orientation and position of the common features in three-dimensional map 1315 at time t=$t_1$:

$$\begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

The correct orientation and position of the tracked common features with respect to device reference frame at time t=$t_0$ (1317) is given by an inverse affine transformation, e.g., $$\begin{bmatrix} R_{ref}^T & -R_{ref}^T * T_{ref} \\ 0 & 1 \end{bmatrix}$$

as provided for in equation (3):

$$\begin{bmatrix} R_{ref}^T & (-R_{ref}^T)*T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (3)$$

Where:
$R^T_{ref}$—Represents the rotation matrix part of an affine transform describing the rotation transformation from the device reference frame 1317 to the device reference frame 1319.
$R_{obj}$—Represents a matrix describing the rotation at $t_0$ of the common features with respect to the device reference frame 1319.
$R'_{obj}$—Represents a matrix describing the rotation at $t_1$ of the common features with respect to the device reference frame 1317.
$T_{ref}$—Represents a vector translation of the device reference frame 1317 to the device reference frame 1319.
$T_{obj}$—Represents a vector describing the position at $t_0$ of the common features with respect to the device reference frame 1319.
$T'_{obj}$—Represents a vector describing the position at $t_1$ of the common features with respect to the device reference frame 1317.

In a yet further example, an orientation and position of the common features in three-dimensional map 1313 at time t=$t_0$: affine transform $$\begin{bmatrix} R_{obj} & T_{obj} \\ 0 & 1 \end{bmatrix},$$

can be converted to an orientation and position of the common features in three-dimensional map 1315 at time t=$t_1$:

$$\begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

Furthermore, the position and orientation of the initial reference frame with respect to a (typically) fixed reference point in space can be determined using an affine transform $$\begin{bmatrix} R_{init} & T_{init} \\ 0 & 1 \end{bmatrix}.$$

The correct orientation and position of the tracked common features with respect to device reference frame at time t=$t_0$ (1317) is given by an inverse affine transformation, e.g., $$\begin{bmatrix} R_{init}^T & (-R_{init}^T)*T_{init} \\ 0 & 1 \end{bmatrix}$$

as provided for in equation (4):

$$\begin{bmatrix} R_{init}^T & (-R_{init}^T)*T_{init} \\ 0 & 1 \end{bmatrix} \begin{bmatrix} R_{ref}^T & (-R_{ref}^T)*T_{ref} \\ 0 & 1 \end{bmatrix} \begin{bmatrix} R_{obj} & T_{obj} \\ 0 & 1 \end{bmatrix} = \quad (4)$$

$$\begin{bmatrix} R'_{obj} & T'_{obj} \\ 0 & 1 \end{bmatrix}$$

Where:
$R^T_{init}$—Represents a rotation matrix part of an affine transform describing the rotation transformation at $t_0$ from the world reference frame 1321 to the device reference frame 1317.
$R^T_{ref}$—Represents the rotation matrix part of an affine transform describing the rotation transformation from the device reference frame 1317 to the device reference frame 1319.
$R_{obj}$—Represents a matrix describing the rotation of the common features at $t_0$ with respect to the device reference frame 1319.
$R'_{obj}$—Represents a matrix describing the rotation of the common features at $t_1$ with respect to the device reference frame 1317.
$T_{init}$—Represents a vector translation at $t_0$ of the world reference frame 1321 to the device reference frame 1317.
$T_{ref}$—Represents a vector translation at $t_1$ of the device reference frame 1317 to the device reference frame 1319.
$T_{obj}$—Represents a vector describing the position at $t_0$ of the common features with respect to the device reference frame 1319.
$T'_{obj}$—Represents a vector describing the position at $t_1$ of the common features with respect to the device reference frame 1317.

In some implementations, the technology disclosed can build a world model with an absolute or world frame of reference. The world model can include representations of object portions (e.g. objects, edges of objects, prominent vortices) and potentially depth information when available from a depth sensor, depth camera or the like, within the viewpoint of the virtual or augmented reality HMD. The system can build the world model from image information captured by the cameras of the sensor. Points in 3D space can be determined from the stereo-image information are analyzed to obtain object portions. These points are not limited to a hand or other control object in a foreground; the points in 3D space can include stationary background points, especially edges. The model is populated with the object portions.

Differences in three-dimensional maps are used to determine an inverse transformation $$\left(\text{the } \begin{bmatrix} R^T & -R^T * T \\ 0 & 1 \end{bmatrix}\right)$$

between model position and new position of common features in the three-dimensional maps. In this affine transform, $R^T$ describes the rotational portions of motions between camera and object coordinate systems, and T describes the translational portions thereof. The system then applies an inverse transformation of the three-dimensional maps corresponding to the actual transformation of the three-dimensional maps to determine the positional information of the HMDs, including translation and rotation of the HMDs.

Figure 15:
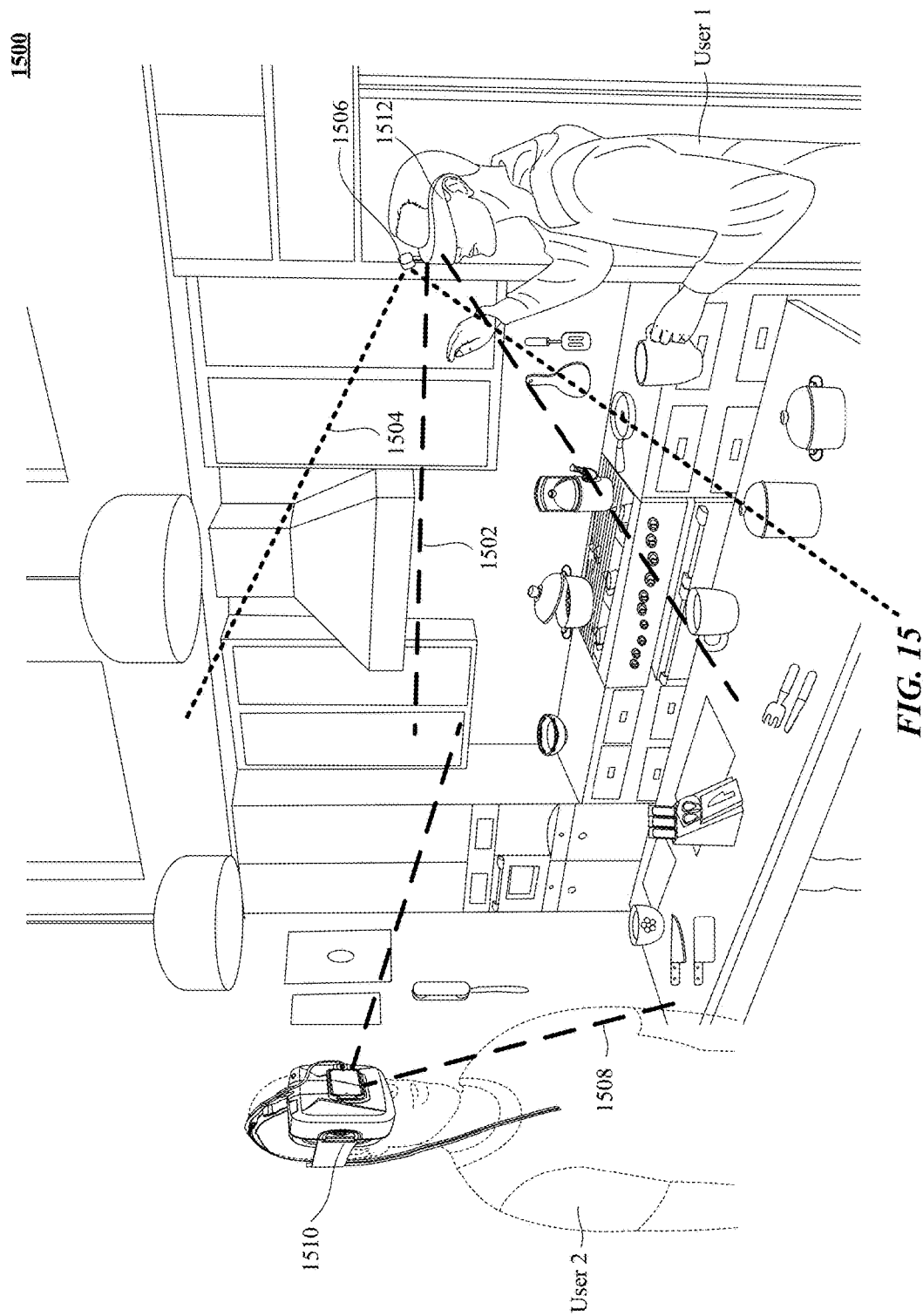
FIGS. 15, 16, 17, and 18 show one implementation of content sharing between wearable sensory systems like HMDs in a three-dimensional sensory real world space.

FIGS. 15, 16, 17, and 18 show one implementation of content sharing between wearable sensory systems like HMDs in a three-dimensional sensory real world space 1500. In FIG. 15, users 1 and 2 are immersed in virtual and/or augmented environments using respective HMDs 1510 and 1512. User 1's HMD 1512 includes multiple image capturing sources 1512 and 1506 such that it captures first and second video streams of the real word space 1500 at different fields of view. This configuration is only exemplary and other implementations can include HMD 1512 having a camera with multiple lens that capture video streams of the real word space 1500 at different fields of view. In other implementations, camera 1506 is embedded in the HMD 1512.

In one implementation, the field of view of camera 1506 substantially overlaps with the field of view of HMD 1512 or vice-versa. In another implementation, the field of view of camera 1506 encompasses and exceeds the field of view of HMD 1512 or vice-versa. In yet another implementation, the field of view of camera 1506 narrows and deceeds the field of view of HMD 1512 or vice-versa.

In one implementation, the field of view of camera 1506 is separate and additional to the field of view of HMD 1512 or vice-versa. In another implementation, the field of view of camera 1506 is separate and additional to the field of view of HMD 1512 or vice-versa. In yet another implementation, the field of view of camera 1506 is separate and additional to the field of view of HMD 1512 or vice-versa.

Some implementations include using short-beam illumination elements to capture a narrow-field of view. Other implementations include the short-beam illumination elements having a beam angle of approximately 60°.

Some implementations include using wide-beam illumination elements to capture a broad-field of view. Other implementations include the wide-beam illumination elements having a beam angle of approximately 120°.

Figure 16:
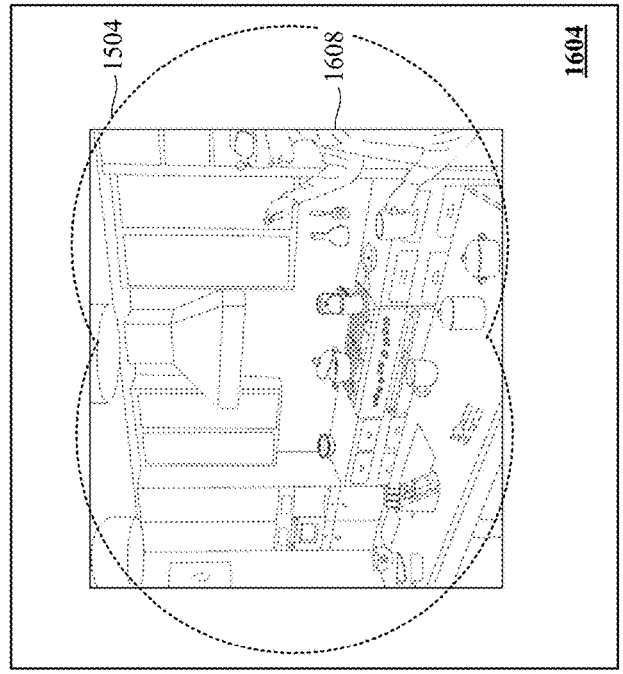
Figure 16:
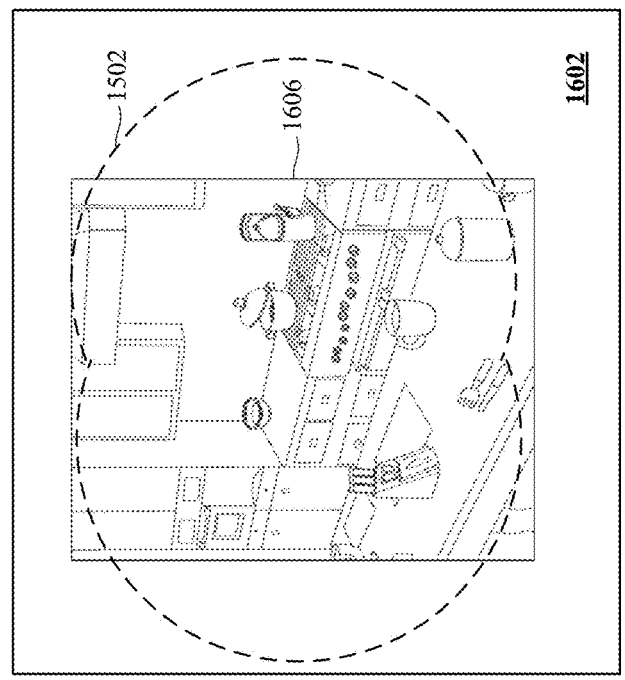

Referring again to FIG. 15, camera 1506's field of view 1504 is wider than HMD 1512's field of view 1502, and therefore the resulting captured frame 1608 from field of view 1504 in block 1604 of FIG. 16 encompasses much greater portion of the real world space 1500 than the captured frame 1606 from field of view 1502 in block 1602 of FIG. 16, as illustrated in implementation 1600 of FIG. 16.

Figure 17:
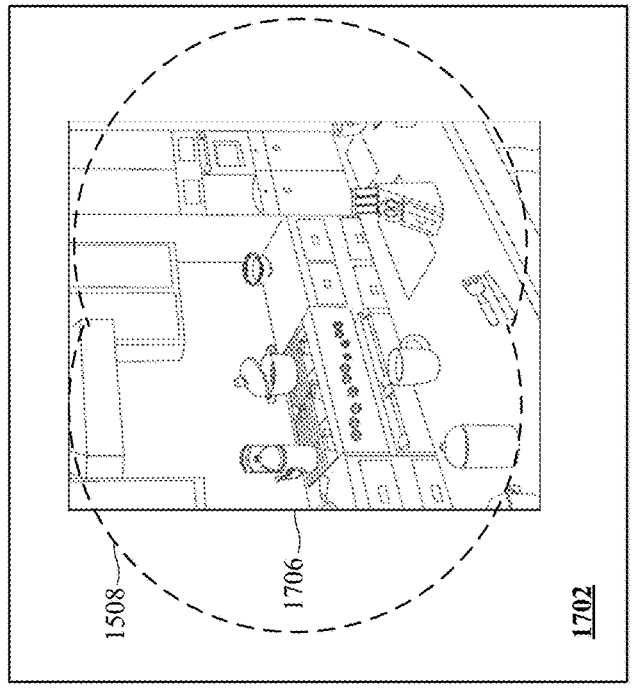

In addition, FIG. 17 depicts, in block 1702, captured frame 1706 from field of view 1508 of user 2's HMD 1510. HMD 1510's field of view 1508 is much narrower than camera 1506's field of view 1504 and is also exactly opposing to field of view 1502 of HMD 1512. Implementation 1700 shows captured frame 1706 includes a much smaller portion of real world space 1500 compared to captured frame 1608.

Figure 18:
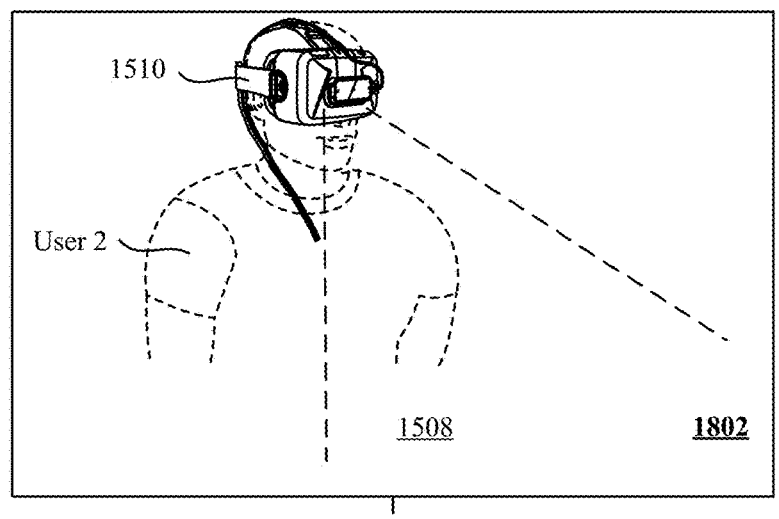
Figure 18:
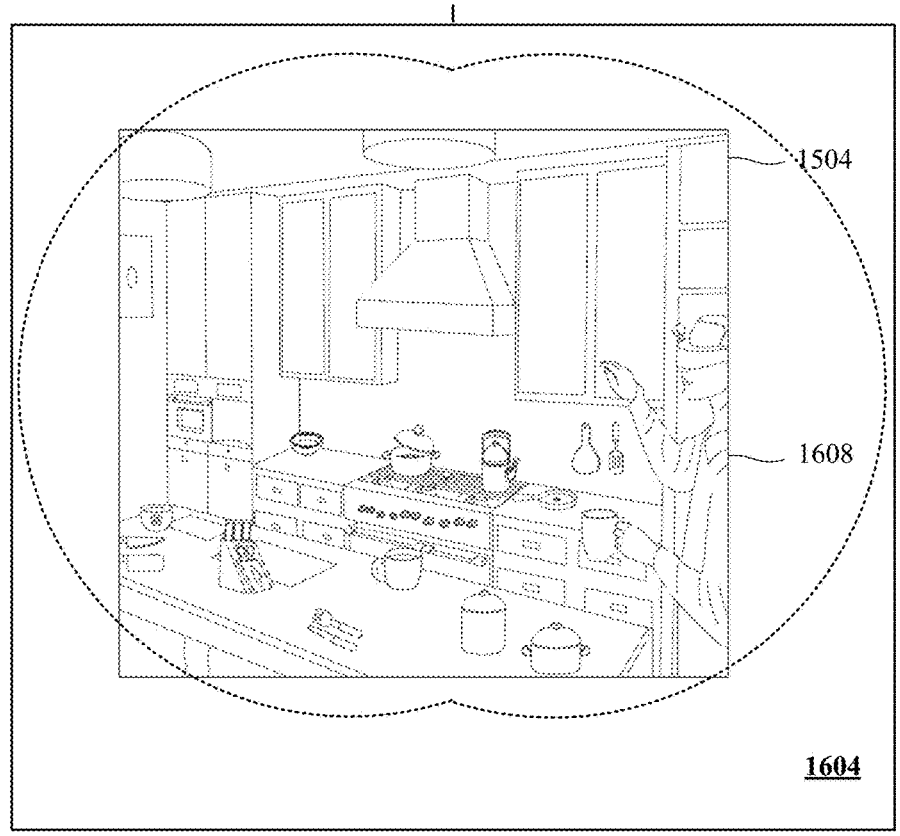

FIG. 18 shows one implementation 1800 of an augmented version of the captured images and video stream being transmitted to user 2 of HMD 1510 in block 1802. The augmented version can include corresponding content, with the same captured frame 1706 as the original version, but captured from a wider or more encompassing field of view 1504 than the original version. The augmented version can be further used to provide a panoramic experience to user 2 of the user 1's limited view 1502.

In one implementation, the captured content 1608 is pre-processed before it is transmitted to user 2. Pre-processing includes enhancing the resolution or contrast of the content or augmenting it with additional graphics, annotations, or comments, according to one implementation. In other implementations, pre-processing includes reducing the resolution of the captured content before transmission.

In some implementations, motion capture is achieved using an optical motion-capture system. In some implementations, object position tracking is supplemented by measuring a time difference of arrival (TDOA) of audio signals at the contact vibrational sensors and mapping surface locations that satisfy the TDOA, analyzing at least one image, captured by a camera of the optical motion-capture system, of the object in contact with the surface, and using the image analysis to select among the mapped TDOA surface locations as a surface location of the contact.

Reference may be had to the following sources, incorporated herein by reference, for further information regarding computational techniques:

1. Wikipedia, at <http://en.wikipedia.org/wiki/Euclidean_group>, on Nov. 4, 2013, 04:08 UTC;
2. Wikipedia, at <http://en.wikipedia.org/wiki/Affine_transformation>, on Nov. 25, 2013, 11:01 UTC;
3. Wikipedia, at <http://en.wikipedia.org/wiki/Rotation_matrix>, Rotation matrix from axis and angle, on Jan. 30, 2014, 20:12 UTC;
4. Wikipedia, at <http://en.wikipedia.org/wiki/Rotation_group_SO(3)>, Axis of rotation, on Jan. 21, 2014, 21:21 UTC;
5. Wikipedia, at <http://en.wikipedia.org/wiki/Transformation_matrix>, Affine Transformations, on Jan. 28, 2014, 13:51 UTC;
6. Wikipedia, at <http://en.wikipedia.org/wiki/Axis%E2%80%93angle_representation>, on Jan. 25, 2014, 03:26 UTC;
7. Wikipedia, at <http://en.wikipedia.org/wiki/Visual_odometry>, on Jun. 26, 2014, 09:38 UTC; and
8. Wikipedia, at <http://en.wikipedia.org/wiki/Optical_flow>, on Jun. 26, 2014, 09:38 UTC.

While the disclosed technology has been described with respect to specific implementations, one skilled in the art will recognize that numerous modifications are possible. The number, types and arrangement of cameras and sensors can be varied. The cameras' capabilities, including frame rate, spatial resolution, and intensity resolution, can also be varied as desired. The sensors' capabilities, including sensitively levels and calibration, can also be varied as desired. Light sources are optional and can be operated in continuous or pulsed mode. The systems described herein provide images and audio signals to facilitate tracking movement of an object, and this information can be used for numerous purposes, of which position and/or motion detection is just one among many possibilities.

Threshold cutoffs and other specific criteria for distinguishing object from background can be adapted for particular hardware and particular environments. Frequency filters and other specific criteria for distinguishing visual or audio signals from background noise can be adapted for particular cameras or sensors and particular devices. In some implementations, the system can be calibrated for a particular environment or application, e.g., by adjusting frequency filters, threshold criteria, and so on.

Any type of object can be the subject of motion capture using these techniques, and various aspects of the implementation can be optimized for a particular object. For example, the type and positions of cameras and/or other sensors can be selected based on the size of the object whose motion is to be captured, the space in which motion is to be captured, and/or the medium of the surface through which audio signals propagate. Analysis techniques in accordance with implementations of the technology disclosed can be implemented as algorithms in any suitable computer language and executed on programmable processors. Alternatively, some or all of the algorithms can be implemented in fixed-function logic circuits, and such circuits can be designed and fabricated using conventional or other tools.

Computer programs incorporating various features of the technology disclosed may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Particular Implementations

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as pervasive computing environment, handheld mode, wide-area mode, augmented reality, embedding architectures, rigged hand, biometrics, etc.

These methods can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, these methods is described with reference to the system that carries out a method. The system is not necessarily part of the method.

Other implementations of the methods described in this section can include a non-transitory computer readable storage medium storing instructions executable by a processor to perform any of the methods described above. Yet another implementation of the methods described in this section can include a system including memory and one or more processors operable to execute instructions, stored in the memory, to perform any of the methods described above.

Some example implementations are listed below with certain implementations dependent upon the implementation to which they refer to:

1. A method of tracking motion of a wearable sensor system, the method including:
capturing a video stream of a scene of a real world space using at least one camera electronically coupled to a wearable sensor system;
using a set of RGB pixels and a set of IR pixels of the camera, detecting one or more feature values of the scene from a plurality of images of the video stream captured at times t0 and t1, wherein the wearable sensor system moved between t0 and t1; and
determining motion information of the wearable sensor system with respect to at least one feature of the scene based on comparison between feature values detected at times t0 and t1.

2. The method of implementation 1, further including generating for display, across an interface of the wearable sensor system, a presentation output based on information from the sets of RGB and IR pixels.

3. The method of implementation 2, further including automatically calibrating responsiveness of the presentation output based on the determined motion information of the wearable sensor system with respect to the at least one feature of the scene.

4. The method of implementation 3, further including proportionally adjusting perceived field of view of the presentation output responsive to the determined motion information of the wearable sensor system with respect to the at least one feature of the scene.

5. The method of implementation 1, further including determining motion information of a body portion engaged with the wearable sensory system based on the motion information of the wearable sensor system.

6. The method of implementation 1, further including extracting gross features of the real world space using RGB pixels that respectively capture red, green, and blue components of illumination in the scene.

7. The method of implementation 1, further including extracting fine features of the real world space using IR pixels that capture infrared components of illumination in the scene.

8. The method of implementation 7, wherein fine features of the real world space include surface texture of the real world space.

9. The method of implementation 7, wherein fine features of the real world space include edges of the real world space.

10. The method of implementation 7, wherein fine features of the real world space include curvatures of the real world space.

11. The method of implementation 7, wherein fine features of the real world space include surface texture of objects in the real world space.
12. The method of implementation 7, wherein fine features of the real world space include edges of objects in the real world space.
13. The method of implementation 7, wherein fine features of the real world space include curvatures of objects in the real world space.
14. The method of implementation 1, wherein a feature of the scene is an object in the real world space.
15. The method of implementation 14, wherein a feature value of the scene is orientation of the object.
16. The method of implementation 14, wherein a feature value of the scene is position of the object.
17. The method of implementation 1, wherein a feature of the scene is an arrangement of plurality of objects in the real world space.
18. The method of implementation 17, wherein a feature value of the scene is position of the objects with respect to each other in the arrangement.
19. The method of implementation 1, wherein comparison between feature values includes detecting a change in rotation between the images captured at times t0 and t1.
20. The method of implementation 1, wherein comparison between feature values includes detecting a change in translation between the images captured at times t0 and t1.
21. The method of implementation 1, further including determining motion information of the wearable sensor system with respect to at least one feature of the scene by matching features in images captured at time t0 with corresponding features in images captured at time t1, wherein the matched features are within a threshold distance.
22. The method of implementation 1, further including determining motion information of the wearable sensor system with respect to at least one feature of the scene by calculating displacement between the images captured at times t0 and t1 based on at least one of RGB and IR pixel values.
23. The method of implementation 1, wherein the motion information includes position of the wearable sensor system.
24. The method of implementation 1, wherein the motion information includes orientation of the wearable sensor system.
25. The method of implementation 1, wherein the motion information includes velocity of the wearable sensor system.
26. The method of implementation 1, wherein the motion information includes acceleration of the wearable sensor system.
27. The method of implementation 1, further including using monocular vision to capture the video stream.
28. The method of implementation 1, further including using stereoscopic vision to capture the video stream.
29. The method of implementation 1, the images captured at times t0 and t1 are successive image pairs.
30. The method of implementation 1, the images captured at times t0 and t1 are alternative image pairs.
31. The method of implementation 1, the images captured at times t0 and t1 are alternative image pairs.
32. The method of implementation 1, the images captured are right and left stereo images captured simultaneously.
33. A method of creating a multi-user interactive virtual environment using wearable sensor systems, the method including:
    capturing a first video stream of a real world space using at least one camera electronically coupled to a first wearable sensor system engaged by a first user;
    capturing a second video stream of a real world space using at least one camera electronically coupled to a second wearable sensor system engaged by a second user;
    using sets of RGB and IR pixels of the first and second cameras, generating respective three-dimensional maps of the real world space by extracting one or more feature values of the real world space from the first and second video streams; and
    determining motion information of the first and second wearable sensor systems with respect to each other based on comparison between the respective three-dimensional maps of the real world space.
34. The method of implementation 33, wherein generating respective three-dimensional maps further includes determining a graph of features of the real world space based on the extracted feature values.
35. The method of implementation 33, further including generating for display, across respective interfaces of the first and second wearable sensor systems, presentation outputs based on information from the sets of RGB and IR pixels of the first and second cameras.
36. The method of implementation 35, further including automatically calibrating responsiveness of the presentation outputs based on the determined motion information of the first and second wearable sensor systems with respect to each other.
37. The method of implementation 36, further including proportionally adjusting respective perceived fields of view of the presentation outputs responsive to the determined motion information of the first and second wearable sensor systems with respect to each other.
38. The method of implementation 33, further including determining motion information of respective body portions of the first and second users based on the motion information of the first and second wearable sensor systems with respect to each other.
39. The method of implementation 33, further including extracting gross features of the real world space using RGB pixels that respectively capture red, green, and blue components of illumination in the real world space.
40. The method of implementation 33, further including extracting fine features of the real world space using IR pixels that capture infrared components of illumination in the real world space.
41. The method of implementation 40, wherein fine features of the real world space include surface texture of the real world space.
42. The method of implementation 40, wherein fine features of the real world space include edges of the real world space.
43. The method of implementation 40, wherein fine features of the real world space include curvatures of the real world space.
44. The method of implementation 40, wherein fine features of the real world space include surface texture of objects in the real world space.
45. The method of implementation 40, wherein fine features of the real world space include edges of objects in the real world space.
46. The method of implementation 40, wherein fine features of the real world space include curvatures of objects in the real world space.
47. The method of implementation 33, wherein a feature of the real world space is an object in the real world space.
48. The method of implementation 47, wherein a feature value of the real world space is orientation of the object.
49. The method of implementation 47, wherein a feature value of the real world space is position of the object.

50. The method of implementation 33, wherein a feature of the real world space is an arrangement of plurality of objects in the real world space.

51. The method of implementation 50, wherein a feature value of the real world space is position of the objects with respect to each other in the arrangement.

52. The method of implementation 33, wherein comparison between feature values includes detecting a change in rotation between the images captured at times t0 and t1.

53. The method of implementation 33, wherein comparison between feature values includes detecting a change in translation between the images captured at times t0 and t1.

54. The method of implementation 33, further including determining motion information of the wearable sensor system with respect to at least one feature of the real world space by matching features in images captured at time t0 with corresponding features in images captured at time t1, wherein the matched features are within a threshold distance.

55. The method of implementation 33, further including determining motion information of the wearable sensor system with respect to at least one feature of the real world space by calculating displacement between the images captured at times t0 and t1 based on at least one of RGB and IR pixel values.

56. The method of implementation 33, wherein the motion information of the first and second wearable sensor systems includes respective positions of the wearable sensor system.

57. The method of implementation 33, wherein the motion information of the first and second wearable sensor systems includes respective orientations of the wearable sensor system.

58. The method of implementation 33, wherein the motion information of the first and second wearable sensor systems includes respective velocities of the wearable sensor system.

59. The method of implementation 33, wherein the motion information of the first and second wearable sensor systems includes respective accelerations of the wearable sensor system.

60. A method of sharing content between wearable sensor systems, the method including:
capturing a first video stream of a real world space at time t0 using at least one camera electronically coupled to a first wearable sensor system engaged by a first user, wherein the first video stream is captured at a field of view of the first user;
capturing a second video stream of the real world space at the time t0 using at least one camera electronically coupled to the first wearable sensor system, wherein the second video stream is captured at a field of view of the camera; and
establishing a communication channel between the first wearable sensor system and a second wearable sensor system and transmitting the second video stream to the second wearable sensor system.

61. The method of implementation 60, further including preprocessing the second video stream to enhance resolution and sending the preprocessed second video stream via the communication channel to the second wearable sensor system.

62. The method of implementation 60, further including preprocessing the second video stream to reduce bandwidth and sending the preprocessed second video stream via the communication channel to the second wearable sensor system.

63. The method of implementation 60, wherein the field of view of the at least one camera substantially overlaps with the field of view of the user.

64. The method of implementation 60, wherein the field of view of the at least one camera encompasses and exceeds the field of view of the user.

65. The method of implementation 60, wherein the field of view of the at least one camera narrows and deceeds the field of view of the user.

66. The method of implementation 60, wherein the field of view of the at least one camera is separate and additional to the field of view of the user.

67. The method of implementation 60, further including using short-beam illumination elements to capture a narrow-field of view.

68. The method of implementation 67, wherein the short-beam illumination elements have a beam angle of approximately 60°.

69. The method of implementation 60, further including using wide-beam illumination elements to capture a broad-field of view.

70. The method of implementation 69, wherein the wide-beam illumination elements have a beam angle of approximately 120°.

71. The method of implementation 60, further including transmitting the second video stream to the second sensor system in response to user selection.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A system for creating a multi-user interactive virtual environment, the system including:
a plurality of wearable sensor systems for displaying a virtual reality to a user wearing the system, including first wearable sensor system engaged by a first user and a second wearable sensor system engaged by a second user;
a plurality of cameras, wherein at least one camera is electronically coupled to each of a wearable sensor system of the plurality of wearable sensor systems; and
one or more processors coupled to a memory storing instructions for creating a multi-user interactive virtual environment, which instructions when executed by one or more processors perform:
capturing a first video stream of a real world space using at least one camera electronically coupled to the first wearable sensor system engaged by a first user;
capturing a second video stream of a real world space using at least one camera electronically coupled to the second wearable sensor system engaged by a second user;
using images from the first and second video streams captured by the camera coupled to the first wearable sensor system and by the camera coupled to the second wearable sensor system, generating respective three-dimensional maps of a real world space by extracting one or more feature values from the real world space from the first and second video streams;

determining motion information of the first and second wearable sensor systems with respect to each other based on comparison between the respective three-dimensional maps of the real world space;
extracting body portion movement information captured by the first and second wearable sensor system with respect to a moving reference frame, including:
repeatedly determining movement information for the wearable sensor system and at least one body portion at successive times to form a sequence of movement information; and
analyzing the sequence of movement information formed to determine a path of the body portion;
tracking movement of the body portion along the path of the body portion over a region of the real world space;
comparing the path tracked to a plurality of path templates and identifying a template that best matches the path; and
using the template that matches the path to obtain control information to control an external system.

2. The system of claim 1, wherein the instructions for generating respective three-dimensional maps further includes instructions that when executed perform determining a graph of features of the real world space based on the one or more feature values extracted.

3. The system of claim 1, further including instructions that when executed perform generating for display, across respective interfaces of the first and second wearable sensor systems, presentation outputs based on information from the images from the first and second video streams captured by the camera coupled to the first wearable sensor system and the camera coupled to the second wearable sensor system.

4. The system of claim 3, further including instructions that when executed perform automatically calibrating responsiveness of the presentation outputs based on the motion information of the first and second wearable sensor systems with respect to each other.

5. The system of claim 4, further including instructions that when executed perform proportionally adjusting respective perceived fields of view of the presentation outputs responsive to the motion information of the first and second wearable sensor systems with respect to each other.

6. The system of claim 1, further including instructions that when executed perform sharing content between wearable sensor systems;
wherein the first video stream of a real world space is captured at a time t0 using at least one camera electronically coupled to a first wearable sensor system engaged by a first user, wherein the first video stream is captured at a field of view of the first user;
wherein the second video stream of the real world space is captured at the time t0 using at least one camera electronically coupled to the first wearable sensor system, wherein the second video stream is captured at a field of view of the camera; and
establishing a communication channel between the first wearable sensor system and a second wearable sensor system and transmitting the second video stream to the second wearable sensor system.

7. The system of claim 6, wherein the field of view of the at least one camera substantially overlaps with the field of view of a user of the at least one camera.

8. The system of claim 6, wherein the field of view of the at least one camera encompasses and exceeds the field of view of a user of the at least one camera.

9. The system of claim 6, wherein the field of view of the at least one camera narrows and deceeds the field of view of a user of the at least one camera.

10. The system of claim 6, wherein the field of view of the at least one camera is separate and additional to the field of view of a user of the at least one camera.

11. The system of claim 6, further including using short-beam illumination elements to capture a narrow-field of view.

12. A method for creating a multi-user interactive virtual environment, the method including:
capturing a first video stream of a real world space using at least one camera electronically coupled to the first wearable sensor system engaged by a first user;
capturing a second video stream of a real world space using at least one camera electronically coupled to the second wearable sensor system engaged by a second user;
using images from the first and second video streams captured by the camera coupled to the first wearable sensor system and by the camera coupled to the second wearable sensor system, generating respective three-dimensional maps of a real world space by extracting one or more feature values from the real world space from the first and second video streams;
determining motion information of the first and second wearable sensor systems with respect to each other based on comparison between the respective three-dimensional maps of the real world space;
extracting body portion movement information captured by the first and second wearable sensor system with respect to a moving reference frame, including:
repeatedly determining movement information for the wearable sensor system and at least one body portion at successive times to form a sequence of movement information; and
analyzing the sequence of movement information formed to determine a path of the body portion;
tracking movement of the body portion along the path of the body portion over a region of the real world space;
comparing the path tracked to a plurality of path templates and identifying a template that best matches the path; and
using the template that matches the path to obtain control information to control an external system.

13. The method of claim 12, further including:
sharing content between wearable sensor systems;
wherein the first video stream of a real world space is captured at a time t0 using at least one camera electronically coupled to a first wearable sensor system engaged by a first user, wherein the first video stream is captured at a field of view of the first user;
wherein the second video stream of the real world space is captured at the time t0 using at least one camera electronically coupled to the first wearable sensor system, wherein the second video stream is captured at a field of view of the camera; and
establishing a communication channel between the first wearable sensor system and a second wearable sensor system and transmitting the second video stream to the second wearable sensor system.

14. A non-transitory computer readable medium storing instructions for creating a multi-user interactive virtual environment, which instructions when executed by one or more processors perform:

capturing a first video stream of a real world space using at least one camera electronically coupled to the first wearable sensor system engaged by a first user;

capturing a second video stream of a real world space using at least one camera electronically coupled to the second wearable sensor system engaged by a second user;

using images from the first and second video streams captured by the camera coupled to the first wearable sensor system and by the camera coupled to the second wearable sensor system, generating respective three-dimensional maps of a real world space by extracting one or more feature values from the real world space from the first and second video streams;

determining motion information of the first and second wearable sensor systems with respect to each other based on comparison between the respective three-dimensional maps of the real world space;

extracting body portion movement information captured by the first and second wearable sensor system with respect to a moving reference frame, including:

repeatedly determining movement information for the wearable sensor system and at least one body portion at successive times to form a sequence of movement information; and analyzing the sequence of movement information formed to determine a path of the body portion;

tracking movement of the body portion along the path of the body portion over a region of the real world space;

comparing the path tracked to a plurality of path templates and identifying a template that best matches the path; and using the template that matches the path to obtain control information to control an external system.

15. The non-transitory computer readable medium of claim 14, further including instructions for:

sharing content between wearable sensor systems;

wherein the first video stream of a real world space is captured at a time t0 using at least one camera electronically coupled to a first wearable sensor system engaged by a first user, wherein the first video stream is captured at a field of view of the first user;

wherein the second video stream of the real world space is captured at the time t0 using at least one camera electronically coupled to the first wearable sensor system, wherein the second video stream is captured at a field of view of the camera; and establishing a communication channel between the first wearable sensor system and a second wearable sensor system and transmitting the second video stream to the second wearable sensor system.

* * * * *